United States Patent
Sato et al.

(10) Patent No.: US 11,565,669 B2
(45) Date of Patent: *Jan. 31, 2023

(54) BRAKING FORCE CONTROLLER AND VEHICLE

(71) Applicant: TOYOTA JIDOSHA KABUSHIKI KAISHA, Toyota (JP)

(72) Inventors: Shun Sato, Toyota (JP); Kazuki Miyake, Toyota (JP); Yoshihisa Yamada, Toyota (JP); Akitsugu Sakai, Toyota (JP); Kazumitsu Sugano, Toyota (JP); Hiroya Fujiwara, Toyota (JP); Hiromasa Takai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,084

(22) Filed: Apr. 14, 2022

(65) Prior Publication Data

US 2022/0234553 A1  Jul. 28, 2022

Related U.S. Application Data

(63) Continuation of application No. 16/743,666, filed on Jan. 15, 2020, now Pat. No. 11,338,779.

(30) Foreign Application Priority Data

Feb. 20, 2019  (JP) .............................. JP2019-028622

(51) Int. Cl.
*B60T 7/12* (2006.01)
*B60T 8/171* (2006.01)
(Continued)

(52) U.S. Cl.
CPC .............. *B60T 7/12* (2013.01); *B60T 8/171* (2013.01); *B60T 8/321* (2013.01); *B60T 8/3275* (2013.01);
(Continued)

(58) Field of Classification Search
CPC . B60T 7/12; B60T 8/171; B60T 8/321; B60T 8/3275; B60T 17/221;
(Continued)

(56) References Cited

U.S. PATENT DOCUMENTS 4,566,067 A  1/1986  Sahasrabudhe et al.
5,721,473 A  2/1998  DeVries
(Continued)

FOREIGN PATENT DOCUMENTS

JP  10-280990 A  10/1998
JP  2004-137702 A  5/2004
(Continued)

*Primary Examiner* — Edwin A Young
(74) *Attorney, Agent, or Firm* — Oblon, McClelland, Maier & Neustadt, L.L.P.

(57) ABSTRACT

A braking force controller causes a first actuator unit to generate a target jerk when the target jerk is equal to or larger than a first jerk, causes the first actuator unit to generate the first jerk and a second actuator unit to generate a jerk obtained by subtracting the first jerk from the target jerk as an additional jerk when the target jerk is smaller than the first jerk and equal to or larger than the sum of the first jerk and a second jerk, and causes the first actuator unit to generate the first jerk and the second actuator unit to generate the second jerk as the additional jerk when the target jerk is smaller than the sum of the first jerk and the second jerk.

20 Claims, 12 Drawing Sheets

(51) Int. Cl.
  *B60T 8/32* (2006.01)
  *B60T 17/22* (2006.01)
  *B60W 10/08* (2006.01)
  *B60W 10/184* (2012.01)
  *B60W 30/18* (2012.01)
  *B60L 53/00* (2019.01)
  *B60K 7/00* (2006.01)

(52) U.S. Cl.
  CPC ........... *B60T 17/221* (2013.01); *B60W 10/08* (2013.01); *B60W 10/184* (2013.01); *B60W 30/18072* (2013.01); *B60W 30/18109* (2013.01); *B60K 7/0007* (2013.01); *B60L 53/00* (2019.02); *B60T 2201/03* (2013.01); *B60T 2220/04* (2013.01); *B60T 2250/00* (2013.01); *B60T 2250/04* (2013.01); *B60T 2270/60* (2013.01); *B60W 2710/08* (2013.01); *B60W 2710/18* (2013.01)

(58) Field of Classification Search
  CPC ............. B60T 2201/03; B60T 2200/04; B60T 2250/00; B60T 2250/04; B60T 2270/60; B60W 10/08; B60W 10/184; B60W 10/196; B60W 10/198; B60W 30/18072; B60W 30/18109; B60W 2710/08; B60W 2710/18; B60L 53/00; B60K 7/0007
  See application file for complete search history.

(56) References Cited

U.S. PATENT DOCUMENTS

| | | | |
|---|---|---|---|
| 11,338,779 B2* | 5/2022 | Sato | ............... B60T 7/12 |
| 2006/0020384 A1 | 1/2006 | Smith et al. | |
| 2008/0214352 A1 | 9/2008 | Ebner et al. | |
| 2013/0138312 A1 | 5/2013 | Breu et al. | |
| 2021/0213941 A1* | 7/2021 | Fukasawa | ............. B60W 30/09 |

FOREIGN PATENT DOCUMENTS

| | | |
|---|---|---|
| JP | 2006-297994 A | 11/2006 |
| WO | 2006/109139 A1 | 10/2006 |

* cited by examiner

FIG. 23
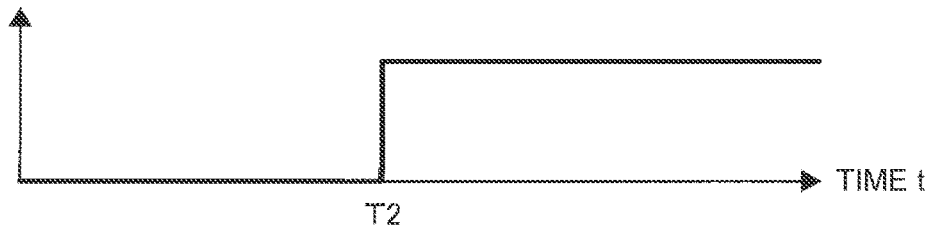
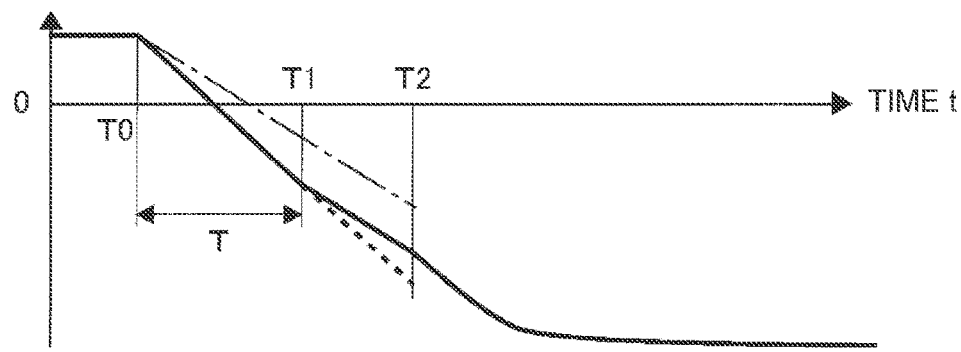
FIG. 24
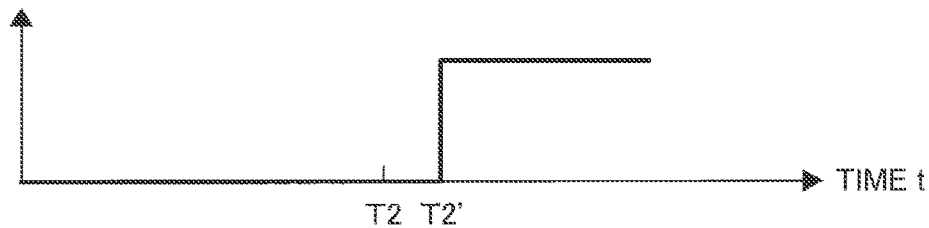
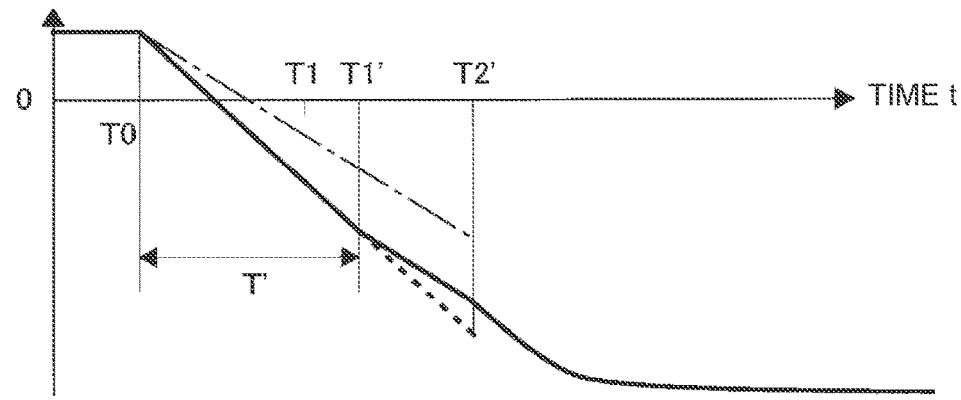

BRAKING FORCE CONTROLLER AND VEHICLE

INCORPORATION BY REFERENCE

The present application is a continuation application of U.S. Application No. 16/743,666, filed Jan. 15, 2020, and claims priority to Japanese Patent Application No. 20194/28622, filed on Feb. 20, 2019. The entire contents of the above-identified applications are incorporated herein by reference in their entirety.

BACKGROUND

1. Technical Field

The disclosure relates to a braking force controller mounted on a vehicle and configured to control a braking force of the vehicle. The disclosure also relates to a vehicle.

2. Description of Related Art

Various technologies are proposed in order to improve ride comfort or operation feel in vehicles. For example, Japanese Unexamined Patent Application Publication No. 10-280990 (JP 10-280990 A) discloses a fuel cut controller configured such that, when a vehicle is decelerated and when a Mel cut is prohibited in order to prevent deterioration of a catalyst at its high temperature, compensation is made for a deceleration force by an alternator, an air conditioner, a brake, a gear shill, and the like so as to obtain an expected deceleration force. Japanese Unexamined Patent Application Publication No. 2006-297994 (JP 2006-297994 A) discloses a vehicle integrated controller configured such that a control target determined based on a user's operation amount is allocated between a drive system and a control system depending on an allocation ratio and a stabilization system is caused to perform correction processing by transmitting the unallocated control target to eliminate the need for the stabilization system to synchronize allocated values of the control target, thereby reducing a delay and improving a response to the operation.

In various types of control, there is proposed control using a physical quantity called jerk. A jerk j is a third derivative of a position x in terms of a time t ($j=d^3x/dt^3$), and the units for its magnitude are, for example, meter per cubic second ($m/s^3$), As understood from this definition, the jerk is the change rate of an acceleration. If the absolute value of a jerk generated in a vehicle or an operation machine is relatively large, the direction and the magnitude of a force applied to each portion change abruptly. Therefore, the vehicle or the operation machine is shocked due to, for example, an impact between components. Japanese Unexamined. Patent Application Publication No. 2004-137702 (JP 2004-137702 A) discloses an actuator controller for an operation machine, which is configured such that a jerk is estimated based on a target speed calculated in response to an operation input to an actuator of the operation machine and, when the estimated jerk is larger than a predetermined value, the target speed is corrected so that the jerk is equal to or smaller than the predetermined value to suppress a shock to be caused by a sudden motion of the operation machine, thereby avoiding failure and a decrease in operation stability.

SUMMARY

In order to achieve dynamic and sporty ride comfort in the vehicle, it is desirable to provide an appropriate deceleration feel to a user in, for example, a coasting state in which the user depresses neither an accelerator pedal nor a brake pedal after the user stops depressing the accelerator pedal.

Factors in the appropriate deceleration feel include not only a reduction in a negative acceleration under the assumption that the traveling direction of the vehicle is defined as a positive direction (an increase in the absolute value of the acceleration in a decelerating direction of the vehicle) but also a reduction in a negative jerk under the assumption that the traveling direction of the vehicle is defined as the positive direction (a quick increase in the absolute value of the acceleration in the decelerating direction of the vehicle). Therefore, the appropriate deceleration feel may be achieved by reducing the negative jerk. If a machine provided in the vehicle is shocked due to the negative jerk, the shock may be transmitted to the user to deteriorate the ride comfort.

The disclosure provides a braking force controller and a vehicle in which a shock can be suppressed while providing an appropriate deceleration feel in a coasting state of the vehicle.

A first aspect of the disclosure relates to a braking force controller. The braking force controller is provided for a vehicle including a differential gear, a first actuator unit configured to generate a braking force in the vehicle by transmitting a force to a wheel via the differential gear, and a second actuator unit configured to generate a braking force in the vehicle by transmitting a force to the wheel without intervention of the differential gear. The braking force controller is configured to control the braking forces to be generated in the vehicle in a coasting state in which an operation amount of an accelerator pedal changes to 0 from a value other than 0 and an operation amount of a brake pedal is 0. The braking force controller includes a processor. The processor is configured to: calculate a target jerk to be generated to obtain the braking forces, the target jerk being a target value of a jerk that is negative when a traveling direction of the vehicle is defined as a positive direction; calculate a first jerk that causes no shock in the differential gear when the first jerk is generated by the first actuator unit, the first jerk being a minimum jerk when the traveling direction of the vehicle is defined as the positive direction; calculate a second jerk generable by the second actuator unit, the second jerk being a minimum jerk when the traveling direction of the vehicle is defined as the positive direction; and control the first actuator unit and the second actuator unit to generate jerks at a start of the coasting state, The processor is configured to: i) cause the first actuator unit to generate the target jerk when the target jerk is equal to or larger than the first jerk; ii) cause the first actuator unit to generate the first jerk and the second actuator unit to generate a jerk obtained by subtracting the first jerk from the target jerk as an additional jerk when the target jerk is smaller than the first jerk and equal to or larger than a. sum of the first jerk and the second jerk; and iii) cause the first actuator unit to generate the first jerk and the second actuator unit to generate the second jerk as the additional jerk When the target jerk is smaller than the sum of the first jerk and the second jerk.

In the first aspect, the processor may be configured to calculate the target jerk based on a vehicle speed.

In the first aspect, the processor may be configured to calculate the target jerk based on at least One of a drive mode and a road gradient. The drive mode indicates a traveling characteristic specified by a user.

In the first aspect, the first actuator unit may include at least an engine. The processor may be configured to calculate the first jerk based on at least a temperature of a coolant of the engine.

In the first aspect, the first actuator unit may include at least a transmission. The processor may be configured to calculate the first jerk based on at least a neat ratio of the transmission.

In the first aspect, the second actuator unit may include an in-wheel motor. The processor may be configured to calculate the second jerk. based on at least one of a charging rate of a battery and a temperature of the in-wheel motor. The battery is charged by regenerated power of the in-wheel motor.

In the first aspect, the second actuator unit may include a service brake. The processor may be configured to calculate the second jerk based on a temperature of a friction material of the service brake.

In the first aspect, the second actuator unit may include an in-wheel motor and a service brake, The processor may be configured to: calculate a third jerk generable by the in-wheel motor, the third jerk being a minimum jerk when the traveling direction of the vehicle is defined as the positive direction; cause the in-wheel motor to generate the additional jerk when the additional jerk is equal to or larger than the third jerk; cause the in-wheel motor to generate the third jerk when the additional jerk is smaller than the third jerk; and cause the service brake to generate a jerk obtained by subtracting the third jerk from the additional jerk.

In the first aspect, the second actuator unit may include a service brake. The service brake may be configured such that: a resistance three to the operation amount of the brake pedal in a case where the braking force is generated at a start of operation has a characteristic different from a characteristic of a resistance force to the operation amount of the brake pedal in a case where the braking force is not generated at the start of the operation. The processor may be configured to measure a foot transfer time ranging from the start of the coasting state by the user to the start of the operation of the brake pedal by the user, and determine, based on the measured foot transfer time, a period in which the jerk is generated by using the service brake.

A second aspect of the disclosure relates to a vehicle. The vehicle includes: a differential gear; a first actuator unit configured to generate a braking force in the vehicle by transmitting a force to a wheel via the differential gear; a second actuator unit configured to generate a braking force in the vehicle by transmitting a force to the wheel without intervention of the differential gear, and a braking force controller configured to control the braking forces to be generated in the vehicle in a coasting state in which an operation amount of an accelerator pedal changes to 0 from a value other than 0 and an operation amount of a brake pedal is 0. The braking force controller is configured to: calculate a target jerk to be generated to obtain the braking forces, the target jerk being a target value of a jerk that is negative when a traveling direction of the vehicle is defined as a positive direction; calculate a first jerk that causes no shock in the differential gear when the first jerk is generated by the first actuator unit, the first jerk being a minimum jerk when the traveling direction of the vehicle is defined as the positive direction, calculate a second jerk generable by the second actuator unit, the second jerk being a minimum jerk when the traveling direction of the vehicle is defined as the positive direction; and control the first actuator unit and the second actuator unit to generate jerks at a start of the coasting state. The braking force controller is configured to i) cause the first actuator unit to generate the target jerk. When the target jerk is equal to or larger than the first jerk: ii) cause the first actuator unit to generate the first jerk and the second actuator unit to generate a jerk obtained by subtracting the first jerk from the target jerk as an additional jerk when the target jerk is smaller than the first jerk and equal to or larger than a sum of the first jerk and the second jerk; and iii) cause the first: actuator unit to generate the first jerk and the second actuator unit to generate the second jerk as the additional jerk when the target jerk is smaller than the sum of the first jerk and the second jerk.

In the second aspect, the braking force controller may be configured to calculate the target jerk based on a vehicle speed.

In the second aspect, the braking, force controller may be configured to calculate the target jerk based on at least one of a drive mode and a road gradient. The drive mode indicates a traveling characteristic specified by a user.

In the second aspect, the first actuator unit may include at least an engine. The braking force controller may be configured to calculate the first jerk based on at least a temperature of a coolant of the engine.

In the second aspect, the first actuator unit may include at least a transmission. The braking force controller may be configured to calculate the first jerk based on at least a gear ratio of the transmission.

in the second aspect, the second actuator unit may include an in-wheel motor. The braking force controller may be configured to calculate the second jerk based on at least one of a charging rate of a battery and a temperature of the in-wheel motor. The battery is charged by regenerated power of the in-wheel motor.

In the second aspect, the second actuator unit may include a service brake, The braking three controller may be configured to calculate the second jerk based on a temperature of a friction material of the service brake.

In the second aspect, the second actuator unit may include an in-wheel motor and a service brake. The braking force controller may be configured to: calculate a third jerk venerable by the in-wheel motor, the third jerk being a minimum jerk when the traveling, direction of the vehicle is defined as the positive direction; cause the in-wheel motor to generate the additional jerk when the additional jerk is equal to or larger than the third jerk; cause the in-wheel motor to generate the third jerk when the additional jerk is smaller than the third jerk; and. cause the service brake to generate a jerk obtained by subtracting the third jerk from the additional jerk.

In the second aspect, the second actuator unit may include a service brake. The service brake may be configured such that a resistance force to the operation amount of the brake pedal in a case where the braking force is generated at a start of operation has a characteristic different from a characteristic of a resistance force to the operation amount of the brake pedal in a case where the braking force is not generated at the start of the operation. The braking force controller may, be configured to measure a foot transfer time ranging from the start of the coasting state by the user to the start of the operation of the brake pedal by the user, and determine, based on the measured foot transfer time, a period in which the jerk is generated by using the service brake.

According to the disclosure, it is possible to provide the braking force controller in which the shock can be suppressed while providing the appropriate deceleration feel in the coasting state of the vehicle.

BRIEF DESCRIPTION OF THE DRAWINGS

Features, advantages, and technical and industrial significance of exemplary embodiments of the disclosure will be described below with reference to the accompanying drawings, m which like numerals denote like elements, and wherein:

FIG. 23 is a diagram illustrating an example of a brake pedal operation amount and an example of an acceleration of a vehicle according to a third embodiment of the disclosure; and FIG. 24 is a diagram illustrating an example of the brake pedal operation amount and an example of the acceleration of the vehicle according to the third embodiment of the disclosure.

DETAILED DESCRIPTION OF EMBODIMENTS

A braking force controller according to the disclosure controls a first actuator unit and a second actuator unit. The first actuator unit transmits a braking force to a wheel via a differential gear. The second actuator unit transmits the braking force to the wheel without intervention of the differential gear The braking force controller calculates a target jerk that is a target value of a jerk to be generated in a vehicle when the vehicle is in a coasting state. The braking force controller generates a jerk in the first actuator unit within a range in which the vehicle is not shocked, and generates a jerk corresponding to a shortage of the target jerk in the second actuator unit within a possible range.

First Embodiment

Figure 1:
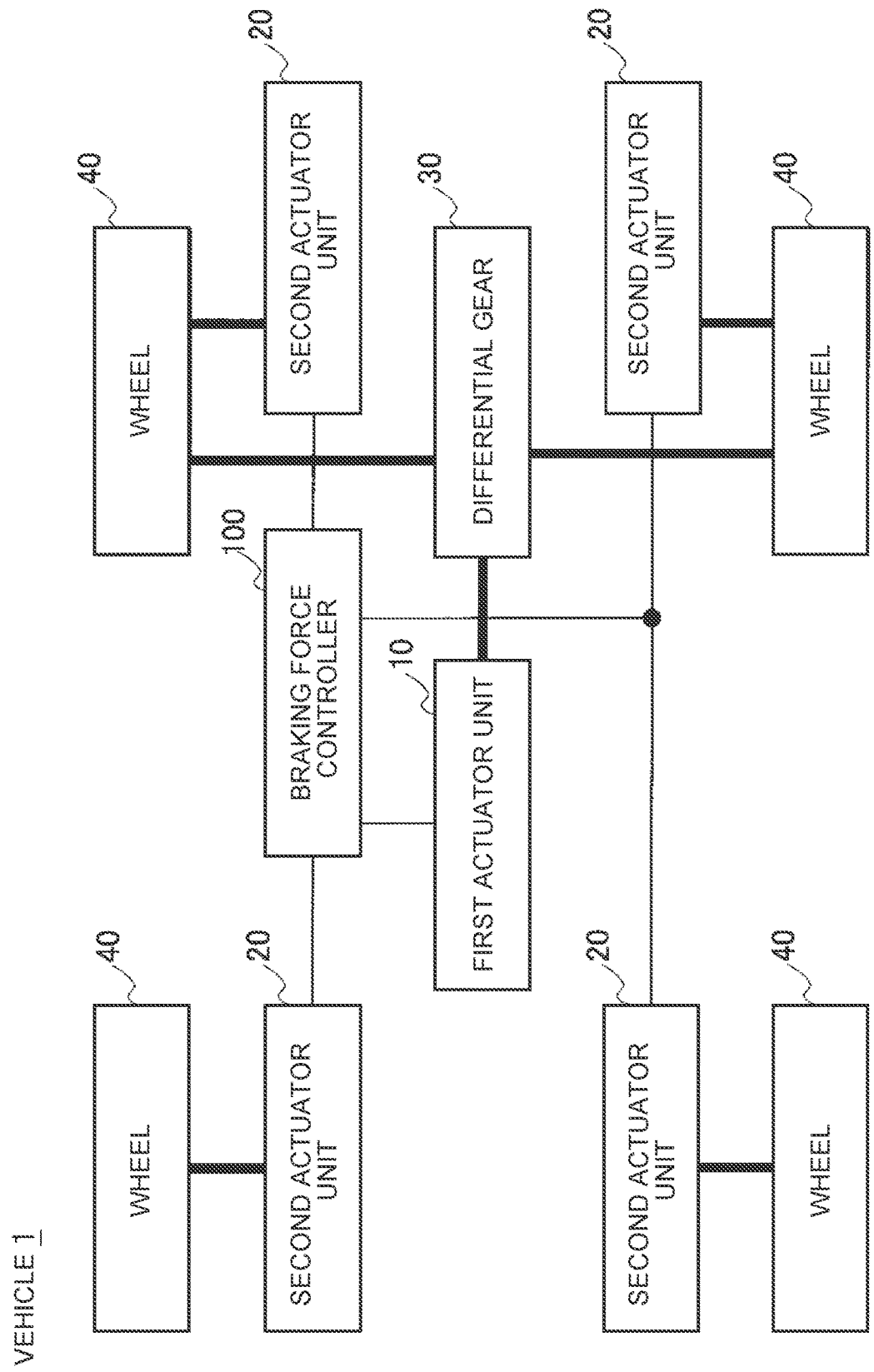
FIG. 1 is a diagram illustrating a main configuration of a vehicle according to each embodiment of the disclosure.

A first embodiment is described below in detail with reference to the drawings. A speed, an acceleration, a jerk, and the like are represented by signed values under the assumption that a traveling, direction of a vehicle is positive.
Configuration FIG. 1 illustrates a main configuration of a vehicle 1 according to this embodiment. For example, the vehicle 1 includes a first actuator unit 10, second actuator units 20, a differential gear 30, wheels 40, and a braking force controller 100. Each of the first actuator unit 10 and the second actuator units 20 can transmit a three to the wheel 40. A force transmission path between units is represented by a wide continuous line, and a control signal path is represented by a narrow continuous line.

The first actuator unit 10 includes one or more actuators. For example, in a case of an engine vehicle, the first actuator unit 10 includes an engine, a transmission, and an alternator. In a case of an electric vehicle, the first actuator unit 10 includes a motor or a transmission. In a case of a hybrid vehicle, the first actuator unit 10 includes an engine, a transmission, and a motor. The first actuator unit 10 can generate not only a driving force but also a braking force by using, for example, a line pressure and a mechanical resistance of the engine and the transmission and a regenerative load of the motor. The driving force and the braking force generated by the first actuator unit 10 are transmitted to the wheels 40 via the differential gear 30. As in the illustrated example, one differential gear 30 may be provided and the driving force and the braking force generated by the first actuator unit 10 may be transmitted to two front wheels or two rear wheels out of the wheels 40. Alternatively, two differential gears 30 may be provided for the front wheels and for the rear wheels and the driving force and the braking three generated by the first actuator unit f 0 may be transmitted to all the wheels 40 via the differential gears 30.

Each second actuator unit 20 includes one or more actuators. For example, the second actuator unit 20 includes either one or both of an in-wheel motor and a service brake, In the illustrated example, the second actuator units 20 are provided for all the wheels 40, respectively: if the second actuator unit 20 includes the in-wheel motor, the second actuator unit 20 can generate a driving force, and can also generate a braking three by using, for example, a regenerative load of the in-wheel motor and a frictional resistance of the service brake. The driving force and the braking force generated by each second actuator unit 20 are transmitted, without intervention of the differential gear 30, to the wheel 40 where the second actuator unit 20 is provided.

The first actuator unit 10 and the second actuator units 20 can generate the braking forces by appropriately operating their actuators in response to control signals from the braking force controller 100. Based on the sum of the braking forces generated by the first actuator unit 10 and the second actuator units 20, a jerk corresponding to the sum of jerks indicated by received instruction values is generated in the vehicle The generation of the jerk in the vehicle through the generation of the braking force by the first actuator unit 10 or the second actuator unit 20 is hereinafter referred to as generation of the jerk by the first actuator unit 10 or the second actuator unit 20.

In this embodiment, as long as the braking force or the first actuator unit 10 is transmitted to at least a subset of the wheels 40 via the differential gear 30 and the braking force of the second actuator unit 20 is transmitted to at least a subset of the wheels 40 without intervention of the differential gear 30, the numbers or those components and their arrangements are not limited, Further, the types and the numbers of the actuators of the first actuator unit 10 and the second actuator unit 20 are not limited.

Figure 2:
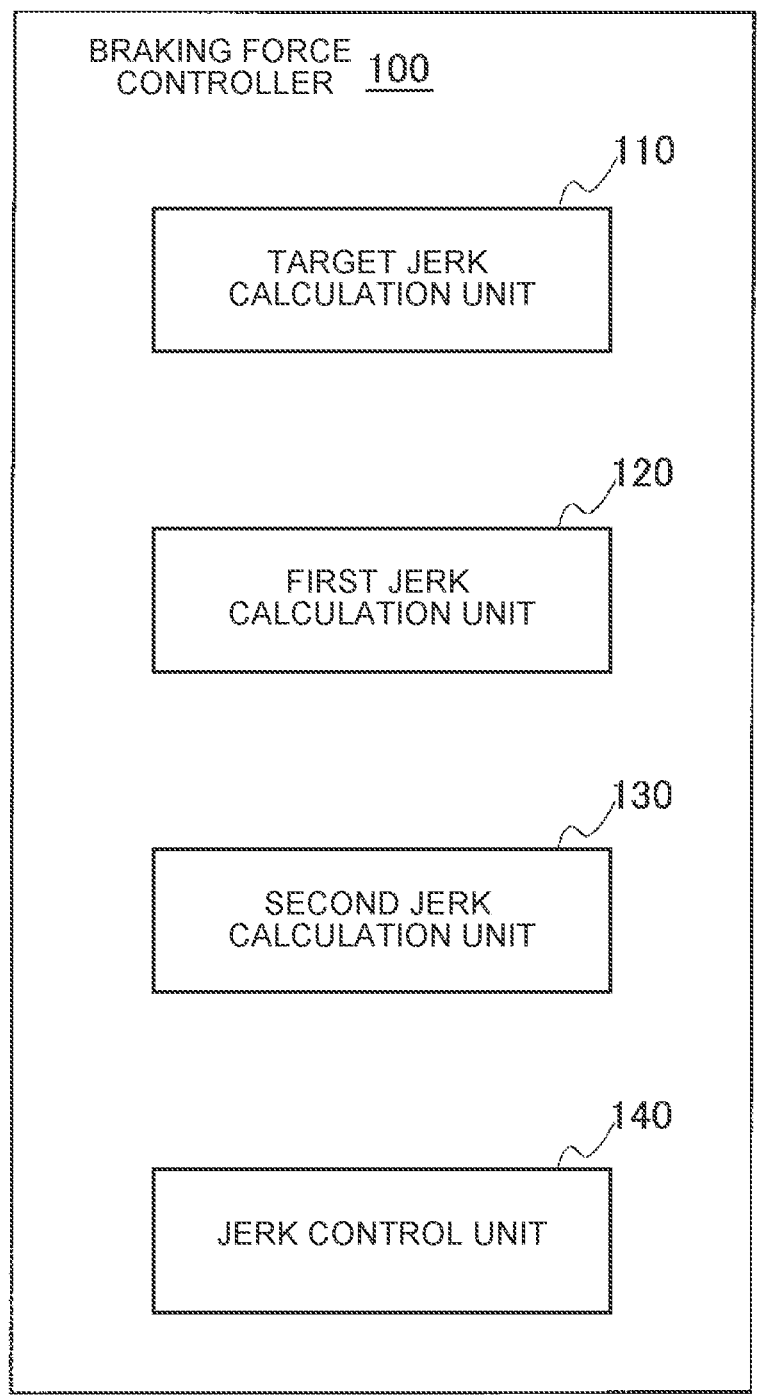
FIG. 2 is a diagram illustrating functional blocks of a braking force controller according to each embodiment of the disclosure.

In the coasting state, the braking force controller 100 controls the first actuator unit 10 and the second actuator units 20 to generate the (braking forces and generate a negative jerk in the vehicle 1. FIG. 2 is a diagram illustrating functional blocks of the braking force controller 100. The braking force controller 100 includes a target jerk calculation unit 110, a first jerk calculation unit 120, a second jerk calculation unit 130, and a jerk control unit 140. The braking force controller 100 may be formed of a processor.

The target jerk calculation unit 110 calculates a jerk to be generated in the vehicle in the coasting state. The first jerk calculation unit 120 calculates a minimum jerk that causes no shock in the vehicle even if the jerk is generated in the first actuator unit 10. The second jerk calculation unit 130 calculates a second jerk that is a minimum jerk generable k each second actuator unit 20, The jerk control unit 140 controls the target jerk calculation unit 110, the first jerk calculation unit 120, and the second jerk calculation unit 130 to generate jerks in the first actuator unit 10 and the second actuator units 20 in the coasting state.

Processing

Figure 3:
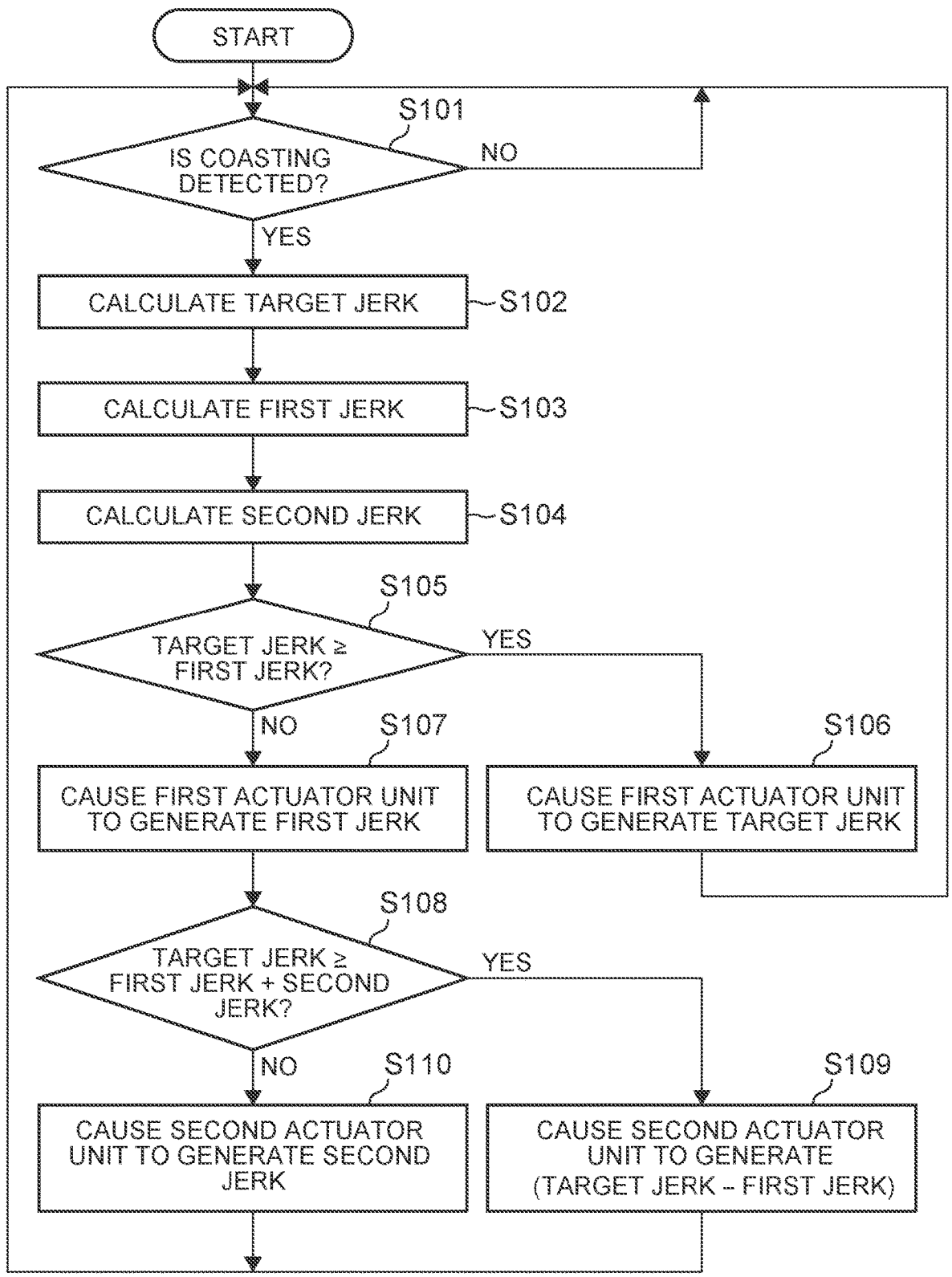
FIG. 3 is a flowchart illustrating processing according to each embodiment of the disclosure.

FIG. 3 us a flowchart illustrating an example of processing to be executed by the braking force controller 100 while a user is driving the vehicle. An example of jerk control by the braking force controller 100 is described with reference to FIG. 3, This processing is executed in a state in which the vehicle 1 can travel by being powered ON.

Step S101: The jerk control unit 140 constantly acquires a user's operation amount of an accelerator pedal and a user's operation amount of a brake pedal, which are detected by an accelerator pedal sensor and a brake pedal sensor provided in the vehicle 1, respectively. Based on the acquired operation amount of the accelerator pedal and the acquired operation amount of the brake pedal, the jerk control unit 140 determines that the vehicle 1 is in the coasting state when the jerk control unit 140 detects that transition is made from a state in which the user is operating the accelerator pedal (the operation amount is not 0) to a state in which the user is not operating the accelerator pedal (the operation amount is 0) and the user is not operating the brake pedal. (the operation amount is 0).

When determination is made that the vehicle 1 is in the coasting state, the jerk control mitt 140 proceeds to Step S102. When determination is not made that the vehicle 1 is in the coasting state, the jerk control unit 140 repeats Step S101, and waits until the vehicle 1 is in the coasting state.

Step S102: The target jerk calculation unit 110 calculates a target jerk that is a target value of the jerk to be generated in the vehicle. The target jerk is expected to provide an appropriate deceleration feel to the user when the vehicle 1 is in the coasting state, and is calculated by a predetermined method.

Examples of the method for calculating the target jerk are described. In each example, there is used a map that defines the target jerk relative to a vehicle speed in advance, FIGS, 4, 5, and 6 schematically illustrate the maps of the respective examples.

Figure 4:
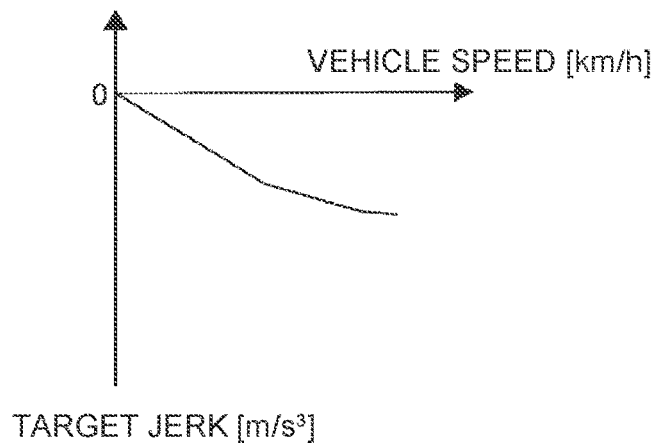
FIG. 4 is a diagram illustrating an example of a map of a target jerk according to each embodiment of the disclosure.

In the example illustrated in FIG. 4, the target jerk decreases as the vehicle speed increases. A specific value can be determined by evaluating the deceleration feel through experiments or the like.

Figure 5:
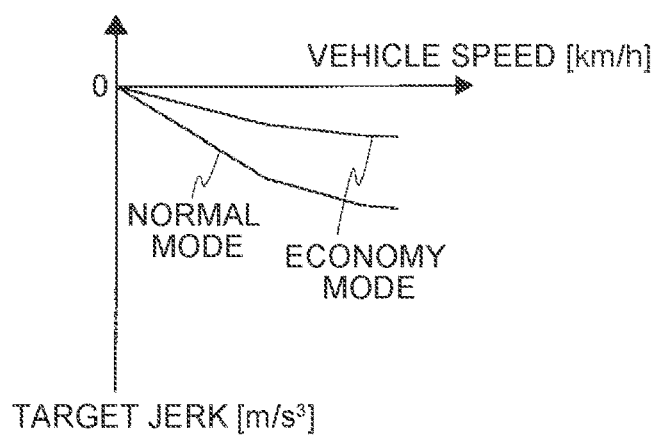
FIG. 5 is a diagram illustrating an example of the nap of the target jerk according to each embodiment of the disclosure.

In the example illustrated in FIG. 5, a drive mode indicating a traveling characteristic specified by the user is taken into consideration. If the drive mode is an economy mode in which the vehicle travels at a high fuel efficiency, the target jerk is set larger at the same speed than that in a normal mode that is a drive mode other than the economy mode. For example, the map illustrated in FIG. 4 is regarded as a map in the normal mode. A map in the economy mode in FIG. 5 can be generated based on values obtained by multiplying the values of the target jerk in the map illustrated in FIG. 4 by a positive coefficient $\alpha$ smaller than 1. For example, if the drive mode is a sport mode in which the vehicle travels sportily, the target jerk may be set smaller at the same speed than that in the normal mode.

Figure 6:
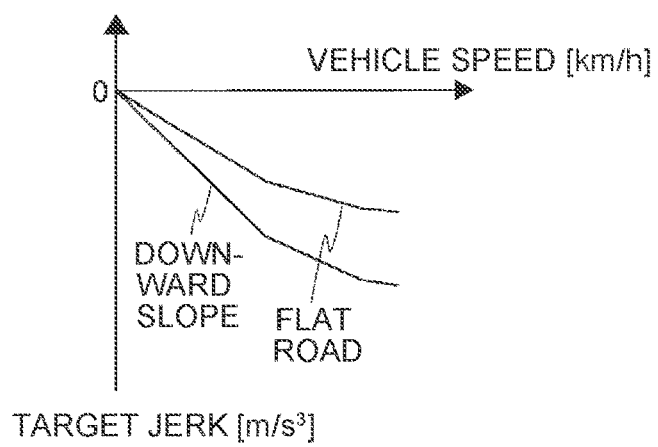
FIG. 6 is a diagram illustrating an example of the map of the target jerk according to each embodiment of the disclosure.

In the example illustrated in FIG. 6, a road gradient is taken into consideration. If the road is a downward slope, the target jerk is set smaller at the same speed than that in a case of a. flat road. For example, the map illustrated in FIG. 4 is regarded as a map in the case of the flat road. A map in the case of the downward slope in FIG. 6 can be generated based on values obtained by multiplying the values of the target jerk in the map illustrated in FIG. 4 by a coefficient $\beta$ larger than 1.

If the road is an upward slope, the target jerk may be set larger at the same speed than that in the case of the fiat road. For example, the map illustrated in FIG. 4 is regarded as a map in the case of the flat road. A map in the case of the upward slope can be generated based on values obtained by multiplying the values of the target jerk M the map illustrated in FIG. 4 by a positive coefficient $\gamma$ smaller than 1.

The target jerk may be calculated based an both the drive mode and the road gradient. For example, the map illustrated in FIG. 4 is regarded as a map in a case of the flat road and the normal mode. A map in a case of the downward slope and the economy mode can be generated based on values obtained by multiplying the values of the target jerk in the map illustrated in FIG. 4 by the coefficient $\alpha$ and the coefficient $\beta$. Similarly, a map in a case of the upward slope and the economy mode can be generated based on values obtained by multiplying the values in the map illustrated in FIG. 4 by the coefficient a and the coefficient $\gamma$.

The target jerk calculation writ 110 can acquire various types of information for use in the calculation of Ole target jerk from various sensors or an electronic control unit (ECU) provided in the vehicle 1. In each example described above, the target jerk calculation unit 110 acquires information indicating the speed of the vehicle 1, the drive mode specified by the user, or the road gradient. The target. jerk calculation unit 110 may acquire other types of information for use i.n the calculation of the target jerk in addition to or in place of those pieces of information. For example, if a camera or a radar detects that another vehicle is present within a predetermined distance ahead of the vehicle, the target jerk calculation nit 110 may acquire information indicating the detection and calculate a target jerk smaller at the same speed than that in a case where no other vehicle is present. According to those examples, a target jerk that provides an appropriate deceleration feel to the user can be calculated depending OD conditions of the vehicle and its surroundings. The above description is illustrative, and the method for calculating the target jerk is not: particularly limited. As described above, a basic map may be prepared and the respective maps may be calculated through multiplication by different coefficients depending on conditions of the vehicle and its surroundings. Alternatively, the individual maps may be generated in advance depending on conditions.

Step S103: The first jerk calculation unit 120 calculates a first jerk that is a minimum jerk that causes no shock the vehicle 1 even if the first jerk is generated in the first actuator unit 10 (jerk having a maximum absolute value in a direction opposite to the traveling direction of the vehicle 1). For example, the shock is an undesirable phenomenon that deteriorates ride comfort by being perceived by the user as an unintended abrupt acceleration change or vibration when an impulse is instantaneously applied to at least a part of the vehicle 1. The shock typically occurs in the vehicle 1 due to a phenomenon called gear rattling that occurs in nears constituting the differential gear 30.

Figure 7:
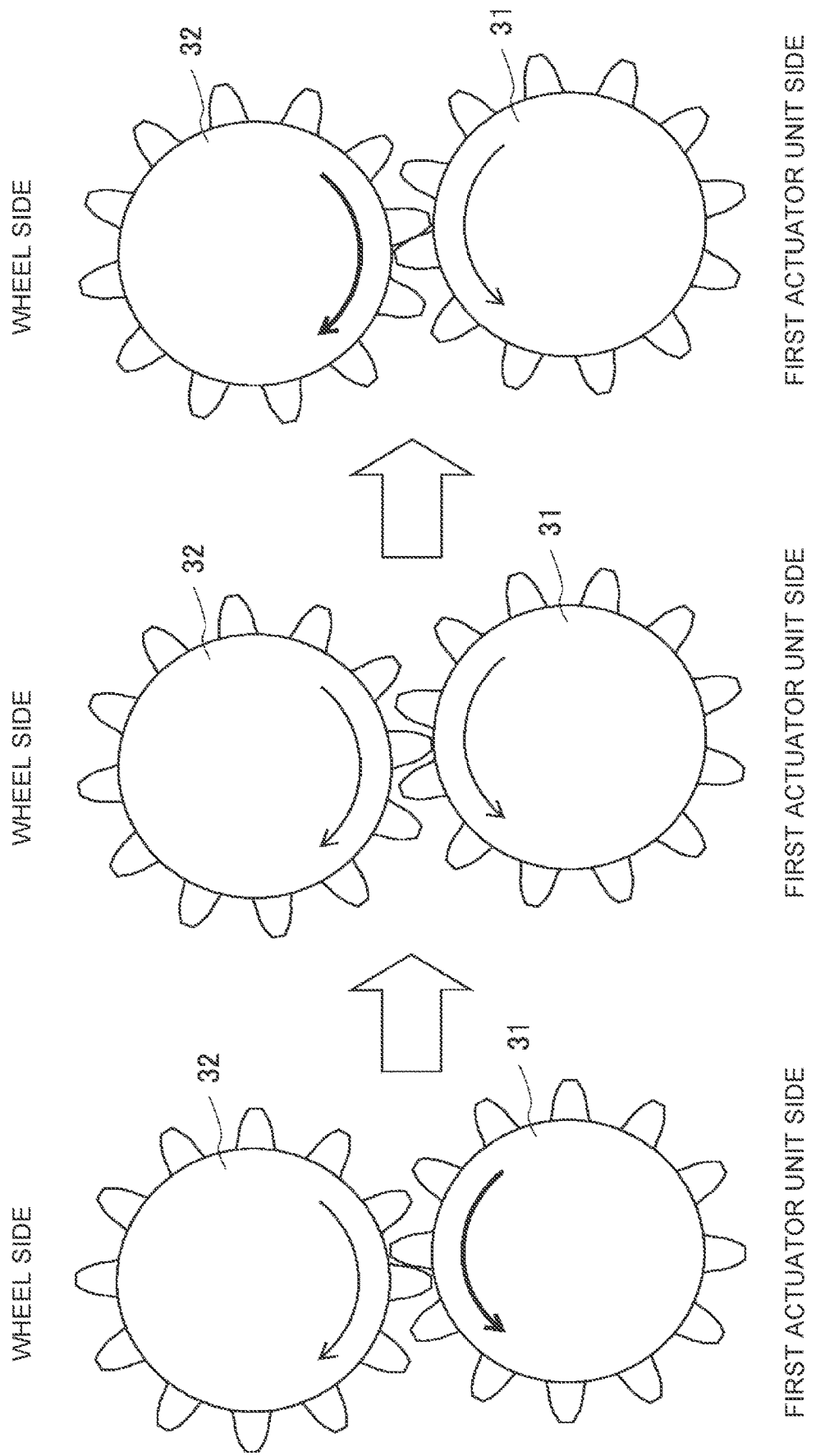
FIG. 7 is a diagram illustrating how gear rattling occurs.

FIG. 7 schematically illustrates how the Rear rattling occurs, The structure of the differential gear 30 is not limited. In arty structure, a gear 31 provided on the first actuator unit 10 side meshes with a gear 32 provided on the wheel 40 side as illustrated in FIG. 7, In a. state on the left of FIG. 7, the first actuator unit 10 generates a driving force for the vehicle 1. In the meshing relationship between the near 31 and the gear 32 as well, the gear 31 is on a driving side relative to the gear 32. In FIG. 7, rotation directions of the gear 31 and the gear 32 are represented by arrows, and the driving side is represented by an arrow wider than that of a driven side.

If the driving force generated by the first actuator unit 10 decreases in the state on the left of 7, the rotation speed of the gear 31 decreases, but the rotation speed of the gear 32 is maintained by inertia of the vehicle 1. Therefore, as in the center of FIG. 7, the gear 31 and the gear 32 are unmeshed, and their tooth flanks are separated from each other. As in the right of FIG. 7, the gear 31 and the gear 32 mesh with each other such that tooth flanks opposite to those on the left of FIG. 7 are brought into contact with each other. Therefore, the gear 31 is on a driven side relative to the gear 32.

If a negative jerk generated by the first actuator unit 10 is extremely small, the impact speed of contact between the tooth flanks increases and a great impulse occurs between the tooth flanks when the meshing relationship between the gear 31 and the gear 32 is reversed. As a result, a shock occurs, If the first actuator unit 10 generates a jerk equal to or larger than the first jerk, the separation of the tooth flanks is unlikely to occur. Even if the tooth flanks are separated and the meshing relationship is reversed, an impulse equal to or larger than a predetermined value does not occur between the tooth flanks, and the shock is suppressed. If the second actuator unit 20 generates a negative jerk while the first actuator unit 10 is generating the jerk equal to or larger than the first jerk, the rotation speed. of the gear 32 tends to decrease as compared to the case where the negative jerk is not generated. Therefore, the separation of the tooth flanks and the reversal of meshing are more unlikely to occur, and the shock is suppressed.

Figure 8:
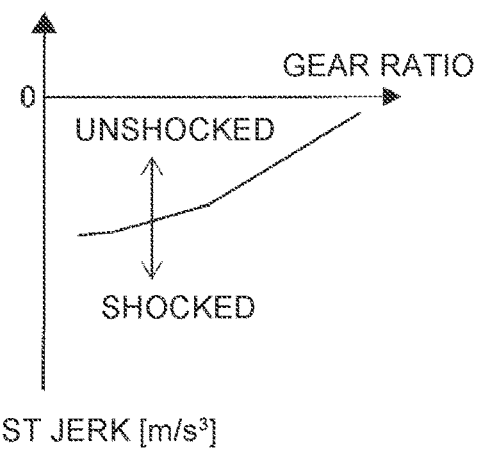
FIG. 8 is a diagram illustrating an example of a map of a first jerk according to each embodiment of the disclosure.
Figure 9:
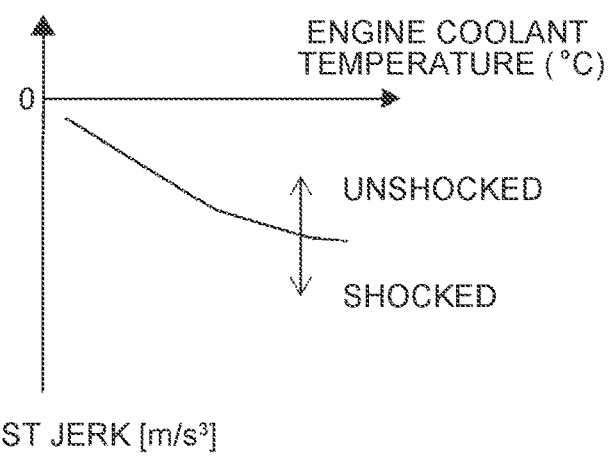
FIG. 9 is a diagram illustrating an example of the map of the first jerk according to each embodiment of the disclosure.

Examples of the method for calculating the first jerk are described. In each example, a predefined map is used. FIGS. 8 and 9 schematically illustrate the maps of the respective examples.

The example illustrated in FIG. 8 can be used when the first actuator unit 10 includes a transmission. In this example, the first jerk increases (the absolute value of the first jerk decreases) as the gear ratio of the transmission increases (in a case of a lower gear). The reason is as follows. As the gear ratio increases, the rotation torque of the gear 31 increases. Therefore,. a great impulse occurs between the gear 31 and the gear 32 even in a case of a relatively large jerk AS a result, a shock is likely to occur.

The example illustrated in FIG. 9 can be used when the first actuator unit 10 includes a water-cooled engine. In this example, the first jerk decreases (the absolute value of the first jerk increases) as the temperature of the coolant of the engine increases. The reason is as follows. As the temperature of the coolant increases, the output torque of the engine is more stable, and a great rotation torque is unlikely to suddenly occur in the gear 32. Therefore, a great impulse is unlikely to suddenly occur between the gear 31 and the gear 32 even in a case of a relatively small jerk. As a result, the possibility of a shock decreases.

The first jerk may be calculated based on both the gear ratio of the transmission and the temperature of the coolant of the engine. For example, a plurality of maps indicating the relationship between the temperature of the coolant and the first jerk as illustrated in FIG. 9 may be prepared in association with a plurality of different gear ratios. Alternatively, a plurality of maps indicating the relationship between the gear ratio and the first jerk as illustrated in FIG. 8 may be prepared in association with a plurality of different temperatures of the coolant. Specific values indicated by the maps can be determined. by evaluating, the shock through experiments or the like.

The first jerk calculation unit 120 can acquire various types of information for use in the calculation of the first jerk from various sensors or the electronic control unit (ECU) provided in the vehicle 1. In each example described above, the first jerk calculation unit 120 acquires information indicating the gear ratio of the transmission or the temperature of the coolant of the engine.

The above description is illustrative, and the method for calculating the first jerk is not particularly limited. If the first actuator unit 10 includes another actuator such as a motor, the first jerk calculation unit 120 may calculate the first jerk based on various conditions of the other actuator such as the motor.

If the first actuator unit 10 is used by combining or switching operations of a plurality of actuators such as a motor and an engine, the first jerk calculation unit 120 may switch the method for calculating the first jerk by using, for example, different maps depending on operation conditions of the actuators.

For example if the vehicle 1 includes two or more differential gears 30 because four or more wheels are driven, the first jerk may be set as a minimum jerk that. causes no shock in each of the differential gears 30. Thus, the first jerk can be calculated as appropriate based on the structure of the first actuator unit 10.

Step S104: The second jerk calculation unit 1:30 calculates the second jerk that is a minimum jerk generable by the second actuator unit 20. Examples of a method for calculating the second jerk are described below. 111 each example, a predefined map is used.

Figure 10:
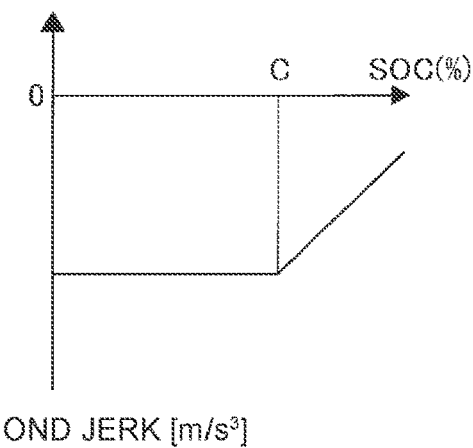
FIG. 10 is a diagram illustrating an example of a map of a second jerk according to each embodiment of the disclosure.
Figure 11:
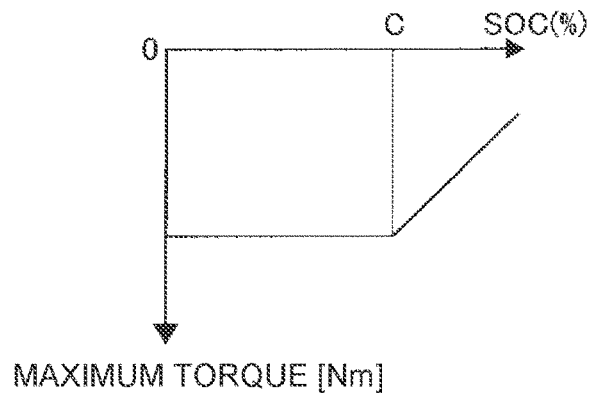
FIG. 11 is a diagram illustrating an example of a relationship between the charging rate of a storage battery and the torque of an in-wheel motor.

FIG. 10 schematically illustrates a map according to one example, The example illustrated in FIG. 10 can be used when the second actuator unit 20 includes an in-wheel motor,. In this example, the second jerk is determined based on the charging rate (SOC) of a battery that is provided in the vehicle 1 and is charged by regenerated power of the in-wheel motor, FIG. 11 illustrates an example of a relationship between the charging rate of the battery and a maximum torque that is a maximum value of a torque generated by a regenerative load. When the charging rate is equal to or smaller than a predetermined value C, the ECU that controls charging of the battery controls the maximum torque at a relatively large constant value in order to obtain a high electric generation efficiency. When the charging rate is larger than the predetermined value C, the ECU controls the maximum torque to decrease in order to reduce the electric generation efficiency as the charging, rate increases. In conjunction with this relationship, when the charging rate is equal to or smaller than the predetermined value C, the second jerk is a relatively small constant value as illustrated in FIG. 10. When the charging rate is larger than the predetermined value C, the second jerk increases (the absolute value of the second jerk decreases) as the charging rate increases.

Figure 12:
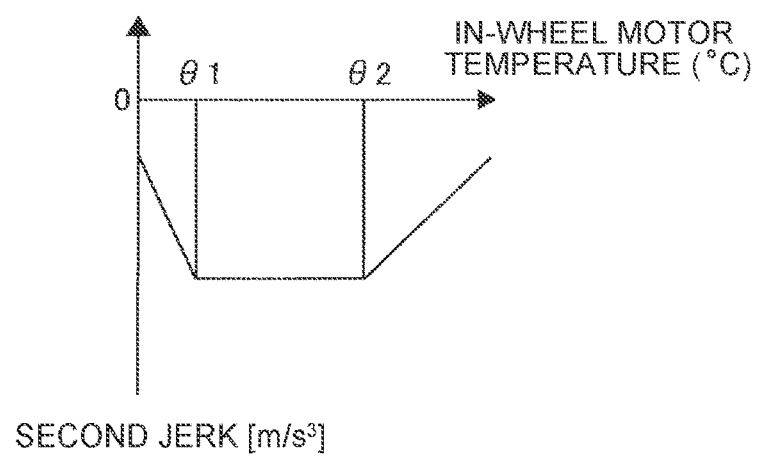
FIG. 12 is a diagram illustrating an example of the map of the second jerk according to each embodiment of the disclosure.

FIG. 12 schematically illustrates a map according to another example. The example illustrated in FIG. 12 can be used when the second actuator unit 20 includes an in-wheel motor. In this example, the second jerk is determined based on the temperature of the in-wheel motor.

Figure 13:
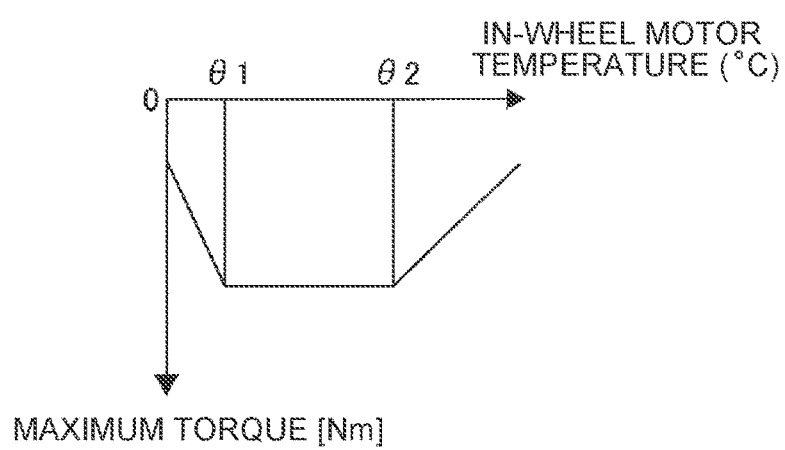
FIG. 13 is a diagram illustrating an example of a relationship between the temperature and the torque of the in-wheel motor.
Figure 14:
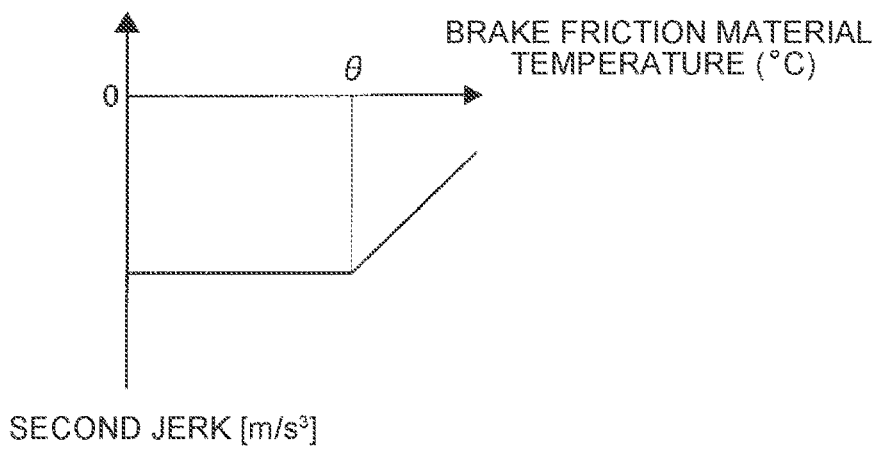
FIG. 14 is a diagram illustrating an example of the map of the second jerk according to each embodiment of the disclosure.

FIG. 13 illustrates an example of a relationship between the temperature of the in-wheel motor and a maximum torque that is a maximum value of a torque generable in a decelerating direction. When the temperature falls within a predetermined range larger than a first predetermined value $\theta 1$ and smaller than a second predetermined value $\theta 2$, the in-wheel motor is suitably operable, and the ECU that controls an output torque of the in-wheel motor controls the maximum torque at a relatively large constant value. When the temperature falls out of this range, the ECU contra ls the maximum torque to decrease as the temperature deviates from the range in order to protect the in-wheel motor. In conjunction with this relationship, when the temperature of the in-wheel motor falls. within the predetermined range larger than the first predetermined value $\theta 1$ and smaller than the second predetermined value $\theta 2$ the second jerk is a relatively small constant value as illustrated in FIG. 12. When the temperature falls out of the predetermined range, the second jerk increases (the absolute value of the second jerk decreases) as the temperature deviates from the predetermined range. In general, the in-wheel motors are provided for two or more wheels 40 in a bilaterally symmetrical manner. Therefore, the second jerk is practically set to the sum of minimum jerks generable by the in-wheel motors, FIG. 14 schematically illustrates a map according to another example. The example illustrated in FIG. 14 can be used. when the second actuator unit 20 includes a service brake. In this example, the second jerk is determined based on the temperature of a friction material of the brake.

Figure 15:
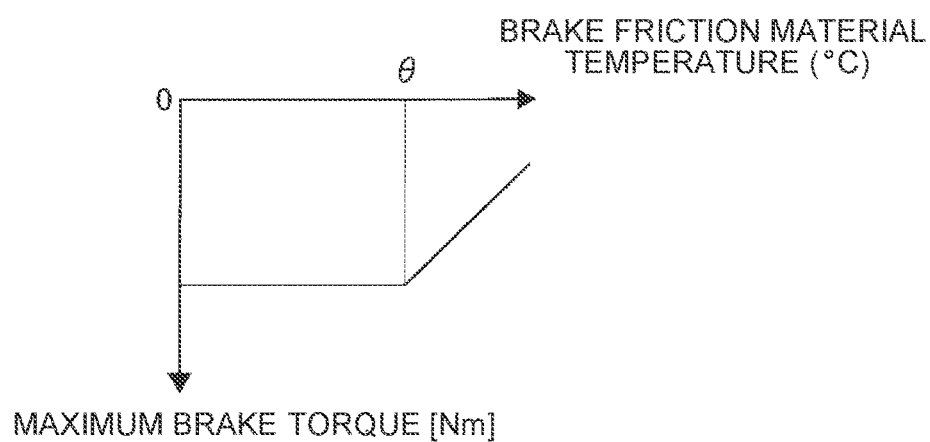
FIG. 15 is a diagram illustrating an example of a relationship between the temperature and the torque of a brake friction material.

FIG. 15 illustrates an example of a relationship between the temperature of the friction material of the brake and a maximum brake torque that is a maximum value of generable brake torque. When the temperature is equal to or smaller than a predetermined value $\theta$, the maximum brake torque is a relatively large constant value. When the temperature is larger than the predetermined value $\theta$, the friction force decreases and the maximum brake torque decreases as the temperature increases. In conjunction with this relationship, when the temperature of the friction material of the brake is equal to or smaller than the predetermined value $\theta$, the second ,jerk is a relatively small constant value as illustrated in FIG. 14. When the temperature is larger than the predetermined value $\theta$, the second jerk increases (the absolute value of the second jerk decreases) as the temperature increases. In general, the service brakes are provided for two or more wheels 40 in a bilaterally symmetrical manner. Therefore, the second jerk is practically set to the sum of minimum jerks generable by the service brakes.

The second jerk calculation unit 130 can acquire various types of information for use in the calculation of the second jerk from various sensors or the electronic. control unit (ECU) provided in the vehicle 1. In each example described above, the second jerk calculation unit 130 acquires information indicating the charging rate of the battery, the temperature of the in-wheel motor, or the temperature of the friction material of the brake.

The above description is illustrative, and the method for calculating the second jerk is not particularly limited. If the second actuator unit 20 includes another actuator, the second jerk calculation unit 3 may calculate the second jerk based on various conditions of the other actuator.

If the second actuator unit 20 is used by combining or switching operations of a plurality of actuators such as an in-wheel motor and a service brake, the second jerk calculation unit 130 ma switch the method for calculating the second jerk b using, for example, different, maps depending on operation conditions of the actuators. Thus, the second jerk can be calculated as appropriate based on the strut e of the second actuator unit 20.

Step S105: The jerk control unit 140 compares the target jerk to the first jerk. When the target jerk is equal to or larger than the first jerk, the jerk control unit 140 proceeds to Step S106. When the target jerk is smaller than the first jerk, the jerk control unit 140 proceeds to Step S107.

Step S106: In this step, the target jerk is equal to or larger than the first jerk. Therefore, the first actuator unit 10 can generate the target jerk alone. The jerk control unit 140 instructs the first actuator unit 10 to generate the target jerk, The engine, the transmission, or the motor of the first actuator unit 10 is generally higher in durability or stability than the in-wheel motor or the service brake of the second actuator unit 20 provided for each wheel 40. By using the first actuator unit 10 with priority over the second actuator unit 20 to generate the target jerk, the component of the second actuator unit 20 having a relatively low durability can be protected, and the jerk can be generated stably. Particularly when a fuel cut for the>engine of the first actuator unit 10 or electrical regeneration of the motor is executed with priority over the use of the service brake of the second actuator unit 20, the fuel efficiency can be improved. Then, the jerk control unit 140 proceeds to Step S.101 to wait air the subsequent start of the coasting state.

Step S107: In this step, the target jerk is smaller than the first jerk. Therefore, the first actuator unit 10 cannot generate the target jerk alone. The jerk control unit 140 instructs the first actuator unit 10 to generate the first jerk, Step S108: The jerk control unit 140 compares the target jerk to the sum of the first jerk and the second jerk, When the target jerk is equal to or larger than the sum of the first jerk and the second jerk, the jerk control unit 140 proceeds to Step S109. When the target jerk is smaller than the sum of the first jerk. and the second jerk, the jerk control unit 140 proceeds to Step S110, Step S109: In this step, the second actuator unit 20 can generate a jerk corresponding to a shortage of the target ,jerk that is caused when the first jerk is generated by the first actuator unit 10 in Step S107. Thus, the first actuator unit 10 and the second actuator unit 20 as a whole can generate the target jerk in the vehicle 1. The jerk control unit 140 instructs the second actuator unit 20 to generate a jerk corresponding to a jerk obtained by subtracting the first jerk from the target jerk as an additional jerk to be added to the jerk generated b the first actuator unit 10. Then, the jerk control unit 140 proceeds to Step S101 to wait for the subsequent start of the coasting state.

Step S110: In this step, even the second actuator unit 20 cannot generate all the jerk corresponding to the shortage of the target jerk that is caused when the first jerk is generated by the first actuator unit 10 in. Step S107. However, the lust actuator unit 10 and the second actuator unit 20 as a whole can generate a possibly minimum jerk in the vehicle 1. The jerk control unit .140 instructs the second actuator unit 20 to generate the second jerk as the additional jerk to be added to the jerk generated by the first actuator unit 10, Then, the jerk control unit 140 proceeds to Step S101 to wait for the subsequent start of the coasting state.

For example, the jerks may be generated in Steps S106, S107, S109, and S110 within a period required until the acceleration of the vehicle 1 reaches a desired negative acceleration. For example, the desired negative acceleration can be set by using a method similar to that in the calculation of the target jerk. That is, a target acceleration can be determined as an acceleration that provides an appropriate deceleration feel by using, for example, a map prepared depending on the vehicle speed, the drive mode, or the road gradient. Alternatively, the jerks may be generated within a predetermined period, or the period may be set variably by using a method similar to that in the calculation of the target jerk.

If the accelerator pedal sensor or the brake pedal sensor provided in the vehicle 1 detects a user's operation for the accelerator pedal or the brake pedal during execution of the processing operations of Steps S102 to S110, the processing is stopped, and the jerk control unit 140 proceeds to Step S101. Apart from this processing, another controller performs general control on the driving force or the braking force in response to the detected operation for the accelerator pedal or the brake pedal.

Figure 16:
FIG. 16 is a diagram illustrating an example of an accelerator pedal operation amount according to each embodiment of the disclosure.
Figure 17:
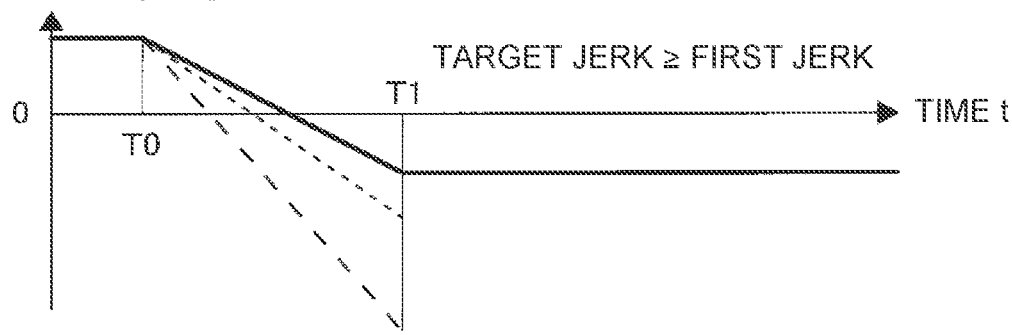
FIG. 17 is a diagram illustrating an example of an acceleration of the vehicle according to each embodiment of the disclosure.
Figure 18:
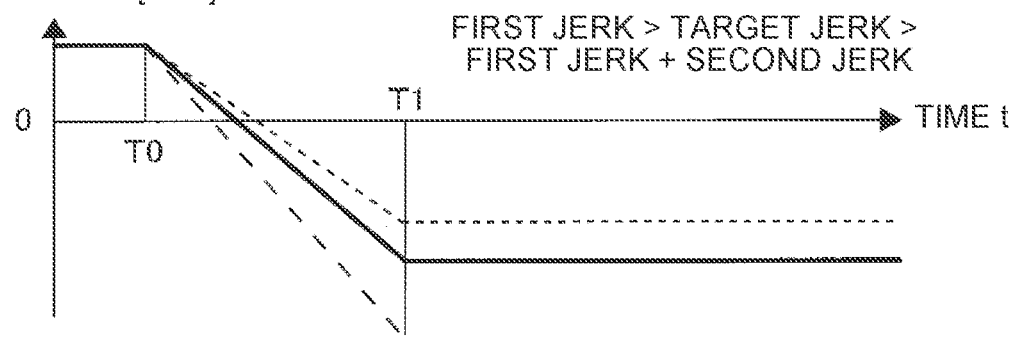
FIG. 18 is a diagram illustrating an example of the acceleration of the vehicle according to each embodiment of the disclosure.
Figure 19:
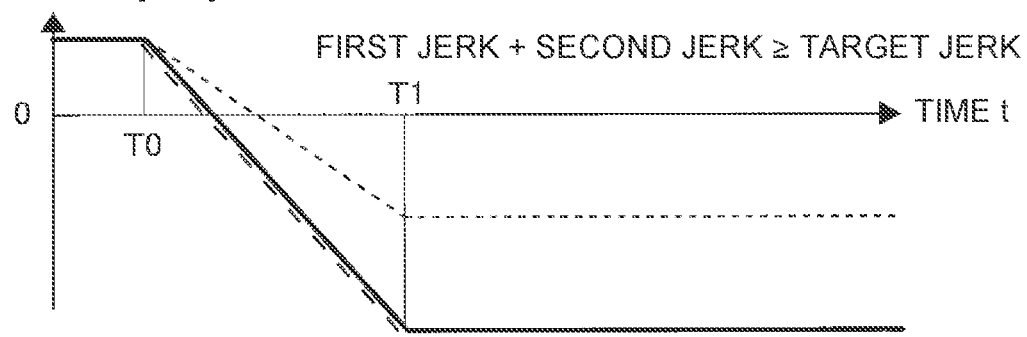
FIG. 19 a diagram illustrating an example of the acceleration of the vehicle according to each embodiment, of the disclosure.

Referring to FIGS. 16, 17, 18, and 19, description is given of how the jerks are controlled through the processing described above. FIG. 16 is a graph in which a horizontal axis represents time and a vertical axis represents the accelerator pedal operation amount. FIGS. 17, 18, and 19 are graphs in which a horizontal axis represents time and a vertical axis represents the acceleration of the vehicle 1. The gradient of the acceleration corresponds to the jerk. As illustrated in FIG. 16, the user is operating, the accelerator pedal when time t<T0, but stops operating the accelerator pedal when time t=T0. In the illustrated period, the user does not operate the brake pedal, FIG. 17 is a graph in a case where the target jerk is equal to or larger than the first jerk. When time t≤T0, a positive acceleration is generated in the vehicle 1 in response to the user's operation for the accelerator pedal. When the time t falls within a period in which T0<t≤T1, the first actuator unit 10 generates the target jerk. In FIG. 17, an acceleration corresponding to the first jerk is represented by a dotted line, and an acceleration corresponding to the sum of the first jerk and the second jerk is represented by a dashed line. in this example, when time t=T1, the acceleration reaches the target acceleration, and the first actuator unit 10 stops generating the jerk. When time t the target acceleration is maintained.

FIG. 18 is a graph a case where the target jerk is smaller than the first jerk and larger than the sum of the first jerk and the second jerk. When time t≤T0, the positive acceleration is generated in the vehicle f in response to the user's operation for the accelerator pedal. When the time t falls within the period in which T0<t≤T1, the first actuator unit 10 generates the first jerk, and the second actuator unit 20 generates a jerk corresponding to (target jerk−first jerk).

In FIG. 18, an acceleration generated by the first actuator unit 10 when time t>T0 is represented by a dotted line, and an acceleration corresponding to the sum of the first jerk and the second jerk when the time t falls within the period in which T0<t≤T1 is represented by a dashed line. In this example, when time t=T1, the acceleration reaches the target acceleration, and the first actuator unit 10 and the second actuator unit 20 stop generating the jerks. When time t>T1, the target a acceleration is maintained.

FIG. 19 is a graph in a case where the target jerk is equal to or smaller than the sum of the first jerk and the second jerk, When time t≤T0, the positive acceleration is generated in the vehicle 1 in response to the user's operation for the accelerator pedal. When the time t falls within the period in which T0<t≤T1, the first actuator unit 10 generates the first jerk, and. the second actuator unit 20 generates the second jerk.

In FIG. 19, the acceleration generated by the first actuator unit 10 when time t>T0 is represented by a dotted line, and the acceleration corresponding to the sum of the first jerk and the second jerk when the time t falls within the period in which T0<t≤T1 is represented by a dashed line. In this example, when time t=T1, the acceleration reaches the target acceleration, and the first actuator unit 10 and the second actuator unit 20 stop generating the jerks. When time t>T1, the target acceleration is maintained.

Effects

In this embodiment, the jerks are controlled b setting the target jerk expected to provide an appropriate deceleration feel. The first actuator unit 10 configured to transmit the braking force to the wheels 40 via the differential gear 30 generates the jerk. within the range in which no shock is caused by the gear rattling in the differential gear 30. The second actuator unit 20 configured to transmit the braking force to the wheel 40 without intervention of the differential gear 30 generates the jerk within a possible range to compensate for the shortage of the target jerk. Thus, the appropriate deceleration feel of the vehicle 1 can be provided. and the shock can be suppressed at the same time. Accordingly, the ride comfort can be improved.

Second Embodiment

In a second embodiment of the disclosure, the second actuator unit 20 of the first embodiment includes an in-wheel motor and a service brake, and the in-wheel motor is used with priority over the service brake when the second actuator unit 20 generates the additional jerk.

In this embodiment, details of the processing operations of Steps S 104, S109, and S110 of the first embodiment are further specified. Description is given of the processing operations according to this embodiment.

In Step S104, when the second jerk calculation unit 130 calculates the second jerk, the second jerk calculation unit 130 calculates a third jerk that is a minimum jerk generable by the in-wheel motor, and a fourth jerk that is a minimum jerk generable by the service brake. For example, the method described in the first embodiment may be used as a specific method for calculating each jerk. The second jerk is determined as the sum of the calculated third and fourth jerks.

In Step S109, when the jerk control unit 140 instructs the second actuator unit 20 to generate the jerk corresponding to the jerk obtained by subtracting the first jerk from the target jerk as the additional jerk, the jerk control unit 140 compares the additional jerk to the third jerk.

When the additional jerk is equal to or larger than the third jerk, the in-wheel motor can generate the additional jerk alone. In this case, the jerk control unit 140 instructs the second actuator unit 20 so that the in-wheel motor generates the additional jerk.

When the additional jerk is smaller than the third jerk, the in-wheel motor cannot generate the additional jerk alone. In this case, the jerk control unit 140 instructs the second actuator unit 20 so that the in-wheel motor generates the third jerk and the service brake generates a jerk corresponding to a jerk Obtained by subtracting the third jerk from the additional jerk.

In Step S110, the additional jerk is the second. jerk equal to the sum of the third jerk and the fourth jerk. Therefore, the jerk control unit 140 instructs the second actuator unit 20 so that the in-wheel motor generates the third jerk and the service brake generates the fourth jerk.

Figure 20:
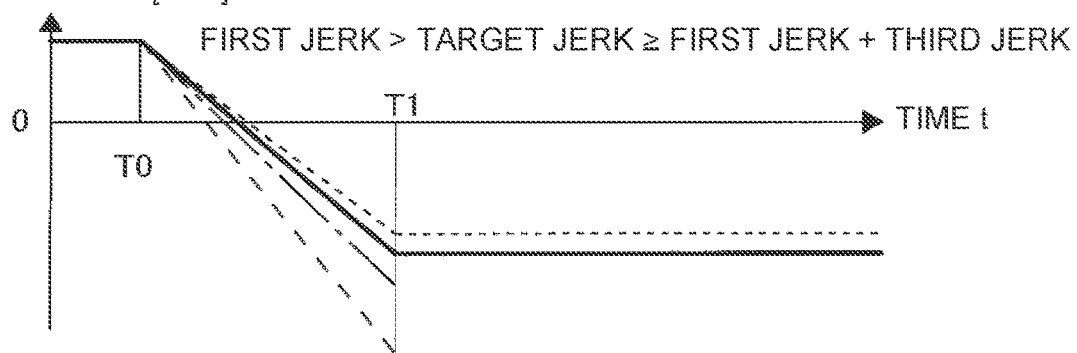
FIG. 20 is a diagram illustrating an example of an acceleration of a vehicle according to a second embodiment of the disclosure.
Figure 21:
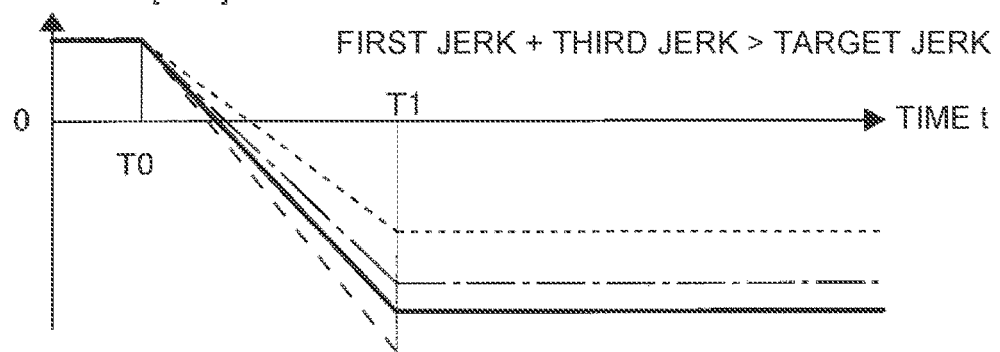
FIG. 21 is a diagram illustrating an example of the acceleration of the vehicle according to the second embodiment of the disclosure.

Referring to FIGS. 20 and 21, description is given of hog the jerks are controlled taking the processing of Step S109 as an example. FIGS. 20 and 21 are graphs in which a horizontal axis represents time and a vertical axis represents the acceleration of the vehicle 1. The gradient of the acceleration corresponds to the jerk. Similarly to FIG. 16, the user is operating the accelerator pedal when time t<T0, but stops operating the accelerator pedal when time t=T0, In the illustrated period, the user does not operate the brake pedal.

FIG. 20 is a graph in a case where the target jerk is smaller than the first jerk and equal to or larger than the sum of the first jerk and the third jerk. When time t≤T0, the positive acceleration is generated in the vehicle l in response to the user's operation for the accelerator pedal. When the time t falls within the period in which T0<t≤T1 is the first actuator unit 10 generates the first jerk, and the second actuator unit 20 generates the jerk corresponding to (target jerk−first jerk) as the additional jerk by using the in wheel motor.

In FIG. 20, the acceleration generated by the first actuator unit 10 when time t>T0 is represented by a dotted line, the acceleration corresponding to the sum of the first jerk and the second jerk when the time t falls within the period in which T0<t≤T1 is represented by a dashed line, and an acceleration corresponding to the sum of the first jerk and the third jerk is represented by a long dashed short dashed line. In this example, when time t=T1, the acceleration reaches the target acceleration, and the first actuator unit 10 and the second actuator unit 20 stop generating the jerks. When time t>T1, the target acceleration is maintained.

FIG. 21 is a graph in a case where the target jerk is smaller than the sum of the first jerk and the third jerk. When time t≤T0, the positive acceleration is generated in the vehicle 1 in response to the user's operation for the accelerator pedal. When the time t falls within the period in which T0<t≤T1, the first actuator unit 10 generates the first jerk, and the second actuator unit 20 generates the third jerk by using the in-wheel motor and generates a jerk corresponding to (target jerk−first jerk−third jerk) by using the service brake. The second actuator unit 20 as a whole generates the jerk corresponding to (target jerk−first jerk) as the additional jerk.

In FIG. 21, the acceleration generated by the first actuator unit 10 when time t>T0 is represented by a dotted line, an acceleration generated by the first actuator unit 10 and the in-wheel motor of the second actuator unit 2.0 is represented by a dashed line, and an acceleration corresponding to the sum of the first jerk and the third jerk when the time t falls within the period in which T<t≤T1 is represented by a lone dashed short dashed line. in this example, when time t=T1, the acceleration reaches the target acceleration, and the first actuator unit 10 and the second actuator unit 20 stop generating the jerks. When time t>T1. the target acceleration is maintained.

Effects

In this embodiment, the appropriate deceleration feel of the vehicle 1 can be provided and the shock can be suppressed at the same time similarly to the first embodiment. Accordingly, the effect of improvement in the ride comfort is attained. Further effects attained in this embodiment are described below.

The jerk to be generated by the in-wheel motor is obtained by using a regenerative load. Therefore, when the in-wheel motor generates the jerk kinetic energy of the vehicle 1 can be converted into electric energy to charge the battery. When the service brake generates the jerk, the kinetic energy of the vehicle 1 is lost as frictional heat. In this embodiment, the second actuator unit 20 generates the jerk by using the in-wheel motor with priority over the service brake. Therefore, the energy loss of the vehicle 1 can be reduced, and the fuel efficiency can be improved.

This embodiment reduces the frequency of use of the service brake including a consumable component such as a friction material and having a relatively low durability. Thus, the We of the component of the service brake can be prolonged.

As a modification of this embodiment, the second actuator unit 20 may include another actuator in place of or in addition to the service brake as an actuator other than the in-wheel motor as long as the in-wheel motor can be used with priority. Alternatively, the second actuator unit 20 may include another actuator in place of or in addition to the in-wheel motor if the actuator is used with priority over the service brake.

Third Embodiment

In a third embodiment of the disclosure, when the second actuator unit 20 generates the additional jerk in the second embodiment, the period of use of the service brake is changed depending on a tendency of the length of a previous foot transfer time of the user. That is, in this embodiment, the period in which the service brake generates the jerk is determined based on the foot transfer time ranging from a timing when the user stops operating the. accelerator pedal to a timing when the user operates the brake pedal through the coasting state of the vehicle 1.

Figure 22:
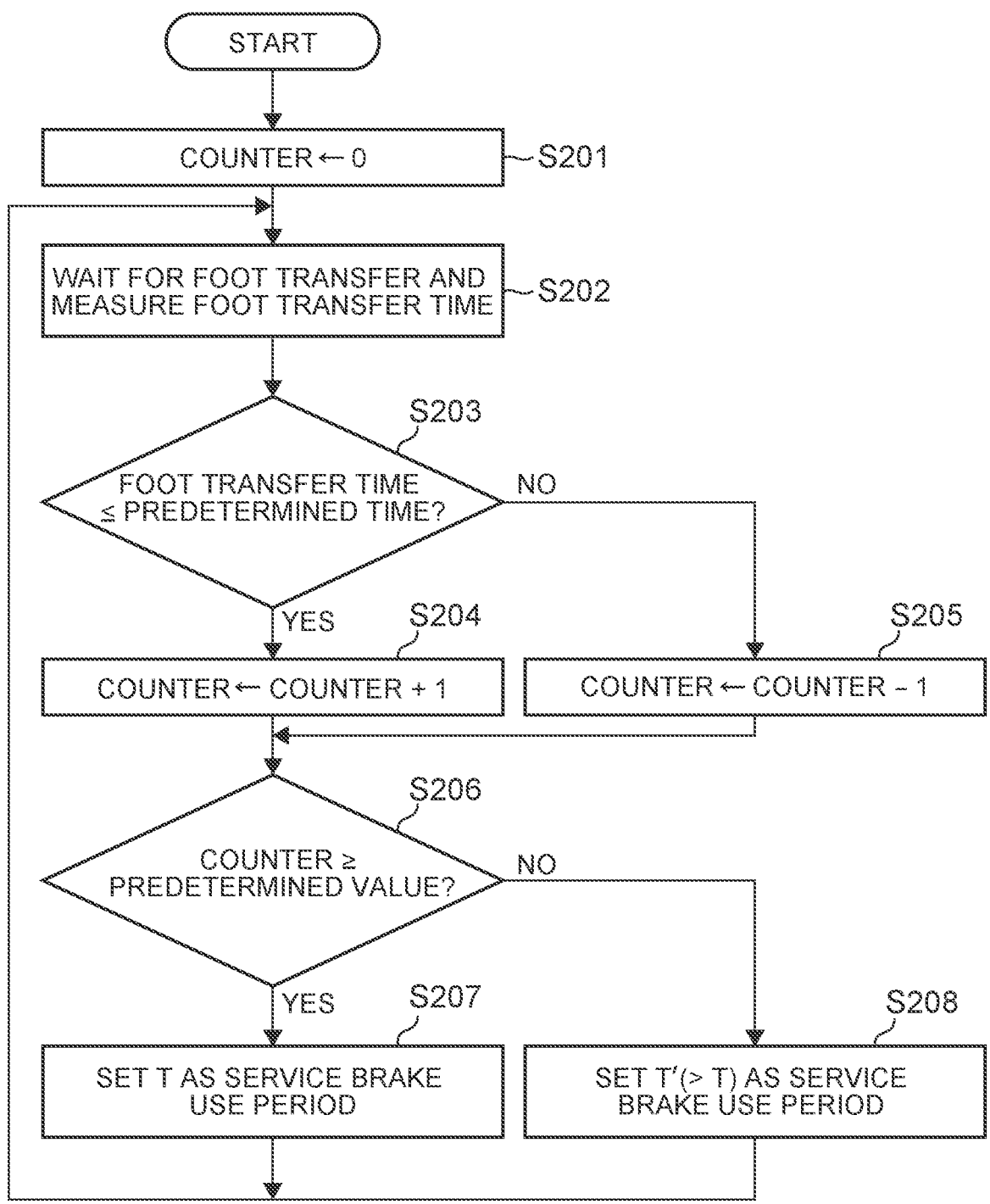
FIG. 22 is a flowchart illustrating processing according to the second embodiment of the disclosure.

In this embodiment, processing of identifying the tendency of the length of the foot transfer time is performed in parallel to the processing operations of Steps S101 to S110. FIG. 22 is a flowchart illustrating an example of this processing. The processing is described with reference to FIG. 22. This processing is executed in the state in which the vehicle 1 can travel by being powered ON.

Step S201: The jerk control Unit 140 sets the value of a counter to an initial value of 0.

Step S202: The jerk control unit 140 constantly acquires a user's operation amount of the accelerator pedal and a user's operation amount of the brake pedal, which are detected by the accelerator pedal sensor and the brake pedal sensor provided in the vehicle 1, respectively. The jerk control unit 140 waits for user's foot transfer. When the foot transfer occurs, the jerk control unit 140 measures the foot transfer time. That is, when the jerk control unit 140 detects that transition is made from the state in which the user is operating the accelerator pedal to the coasting state in Which the user is operating neither the accelerator pedal nor the brake pedal, the jerk control unit 140 acquires a time of transition to the coasting state. When transition is made to the state in which the user is operating the brake pedal, the jerk control unit 140 acquires a time of transition to this state. The jerk control unit 140 determines a difference between the times as the foot transfer time.

Step S203: The jerk control unit 140 compares the foot transfer time to a predetermined time, When the foot transfer time is equal to or shorter than the predetermined time, the jerk control unit 140 proceeds to Step S204. When the foot transfer time is longer than the predetermined time, the jerk control unit 140 proceeds to Step S205.

Step S204: The jerk control unit 140 increments the value of the counter by 1. Then, the jerk control unit 140 proceeds to Step S206.

Step S205: The jerk control unit 140 decrements the value of the counter by 1. Then, the jerk control unit 140 proceeds to Step S206.

Step S206: The jerk control unit 140 compares the value of the counter to a predetermined value. When the value of the counter is equal to or larger than the predetermined, value, the jerk control unit 140 proceeds to Step S207. When the value of the counter is smaller than the predetermined value, the jerk control unit 140 proceeds to Step S208.

Step S207: The jerk control unit 140 sets a predetermined period T as the period in which the service brake is used when the second actuator unit 20 generates the additional jerk. Then, the jerk control unit 140 proceeds to Step S202.

Step S208: When the jerk control unit 140 proceeds to this step, the foot transfer time of the user tends to be longer than that in the case where the jerk control writ 140 proceeds to Step S207. In conjunction with this tendency, the jerk control unit 140 sets a predetermined period T' longer than the period T as the period in which the service brake is used when the second actuator unit 20 generates the additional jerk. Then, the jerk control unit 140 proceeds to Step S202.

For example, the execution of the processing described above is started when the vehicle makes transition from a power-OFF state to a power-ON state, and is terminated When the vehicle is powered OFF. In Step S201, the counter value is initialized only in the first execution in the second and subsequent executions, the last counter value in the previous execution may be used as the counter value instead of initializing the counter value. Alternatively, the counter value may be initialized once in every predetermined number of executions, and the last counter value in the previous execution may be used in the other executions. Thus, the frequency of initialization of the counter value is not limited. As the frequency of initialization decreases, the tendency of the foot transfer time of the user over a longer previous period is reflected in the setting of the period in Step S207 or S208. The timing to execute initialization may be varied such that initialization is executed in response to a change of the user of the vehicle 1.

In this embodiment, details of the processing operation of Step S104 of the first embodiment are further specified to be analogous to those of the second embodiment. The processing operations of Steps S109 and S110 of the first embodiment are partially analogous to those of the second embodiment, but are changed partially. Description is given of the processing operations according to this embodiment.

in Step S104, when the second jerk calculation unit 130 calculates the second jerk, the second jerk calculation unit 130 separately calculates the third jerk that is a minimum jerk generable by the in-wheel motor, and the fourth jerk that is a minimum jerk generable by the service brake. For example, the method described in the first embodiment may be used as a specific method for calculating each jerk. The second jerk is determined as the sum of the calculated third and fourth jerks. The processing of this step is analogous to that of the second embodiment.

In Step S109, when the jerk control unit 140 instructs the second actuator unit 20 to generate the jerk corresponding to the jerk obtained by subtracting the first jerk from the target jerk as the additional jerk, the jerk control unit 140 compares the additional jerk to the third jerk.

When the additional jerk is equal to or target than the third jerk, the in-wheel motor can generate the additional jerk alone. In this case, the jerk control unit 140 instructs the second actuator unit 20 so that the in-wheel motor generates the additional jerk.

When the additional jerk is smaller than the third jerk, the in-wheel motor cannot generate the additional jerk alone. In this case, the jerk control unit 140 instructs the second actuator unit 20 so that the in-wheel motor generates the third jerk and the service brake generates the jerk corresponding to the jerk obtained by subtracting the third jerk from the additional jerk. Step S109 is analogous to that of the second embodiment up to this phase. The subsequent processing is different from that of the second embodiment.

The jerk control unit 140 causes the service brake to generate the jerk for the period T or the period T' set as the period of use of the service brake, Then, the service brake stops generating the jerk.

In Step S110, the additional jerk is the second jerk equal to the sum of the third jerk and the fourth jerk, Therefore, the jerk control unit. 140 instructs the second actuator unit 20 so that the in-wheel motor generates the third jerk and the service brake generates the fourth jerk. Step S110 is analogous to that of the second embodiment up to this phase. The subsequent processing is different from that of the second embodiment.

The jerk control unit 140 causes the service brake to generate the jerk for the period T or the period T' set as the period of use of the service brake. Then, the service brake stops generating the jerk.

Referring to FIGS. 23 and 24, description is given of how the jerks are controlled taking the processing of Step S109 as an example. FIGS. 23 and 24 are graphs in which a horizontal axis represents time and a vertical axis represents the user's operation amount of the brake pedal and the acceleration of the vehicle 1. The gradient of the acceleration corresponds to the jerk. Similarly to FIG. 16, the user is operating the accelerator pedal when time t<T0, but stops operating the accelerator pedal when time t=T0.

FIG. 23 is a graph in a case where the target jerk is smaller than the sum of the first jerk and the third jerk. When time t≤T0, the positive acceleration is generated in the vehicle 1 in response to the user's operation for the accelerator pedal. In the example illustrated in FIG. 23, the foot transfer time of the user tends to be relatively short. The jerk control unit 140 sets the period T as the period in which the second actuator unit 20 uses the service brake.

When the time t falls within. the period in which T0<t≤T1 corresponding to the period T, the first actuator unit 10 generates the first Jerk. Further, the second actuator unit 20 generates the third jerk by using the in-wheel motor and generates the jerk corresponding to (target jerk−first jerk−third jerk) by using the service brake. Thus, the second actuator unit 20 as a whole generates the jerk corresponding to (target jerk−first jerk) as the additional jerk.

When the time t falls within a period in which T1<t≤T2 until the user operates the brake pedal when time t=T2, the first actuator unit 10 generates the first jerk, and the second actuator unit 20 generates the third jerk by using the in-wheel motor but does not generate the jerk by using the service brake. When time t≥T2, the service brake generates a braking force based on a user's operation for the brake pedal, and the acceleration further decreases.

In FIG. 23, an acceleration corresponding to the sum of the first jerk and the third jerk when the time t falls within a period in Which T0<t≤T2 is represented by a long dashed short dashed line. Further, an acceleration under the assumption that the service brake continues to generate the jerk When the time t falls within the period in which T1<t≤T2 is represented by a dotted line.

FIG. 24 is a graph in a case where the target jerk is smaller than the sum of the first jerk and the third jerk similarly to FIG. 23. When time t≤T0, the positive acceleration is generated in the vehicle in response to the user's operation far the accelerator pedal. In the example illustrated in FIG. 24, the foot transfer time of the user tends to be relatively long unlike the example illustrated in FIG. 23. The jerk control unit 140 sets the period T' (>T) as the period in which the second actuator unit 20 uses the service brake.

When the time t falls within a period in which T0<t≤T1' corresponding to the period T', the first actuator unit 10 generates the first jerk. Further, the second actuator unit 20 generates the third jerk by using the in-wheel motor and generates the jerk corresponding to (target jerk−first jerk−third jerk) by using the service brake. Thus, the second actuator unit 20 as a whole generates the jerk corresponding to (target jerk−first jerk) as the additional jerk.

When the time t fills within a period in which T1'<t≤T2' until the user operates the brake pedal when time t=T2', the first actuator unit 10 generates the first jerk, and the second actuator unit 20 generates the third jerk by using the in-wheel motor but does not generate the jerk by using the service brake. When time t≥T2', the service brake generates a braking force based on a user's operation for the brake pedal, and the acceleration further decreases.

In FIG. 24, an acceleration corresponding to the sum of the first jerk and the third jerk when the time t falls within a period in which T0<t≤T2' is represented by a long dashed short dashed line. Further, an acceleration under the assumption that the service brake continues to generate the jerk when the time t falls within the period in which T1<t≤T2' is represented by a dotted line.

In the example illustrated in FIG. 23, the service brake does not operate when the time t falls within the period in which T1<t≤T2. In the example illustrated in FIG. 24, the service brake does not operate when the time t falls within the period in Which T1'<t≤T2'. In those periods, the service brake is not used intendedly even if the target jerk can be achieved by using the service brake. Effects of this setting are described below.

In general, the service brake generates the braking force such that a pressure of oil in a cylinder or a pressure of air is increased, the pressure is transmitted for driving to the friction material provided for each wheel 40 via a brake pipe, and the friction material is pushed against a disc or drum provided for each wheel 40. The operation principle of the service brake is basically the same in it case where the service brake is operated by the second actuator unit 20 and ill a ease where the service brake is operated by a user's operation of depressing the brake pedal.

In the service brake, the pressure of the oil or the like is controlled in a system in which a force generated by the user's operation for the brake pedal dynamically and directly transmitted to the oil in the cylinder or the like, a system in which the operation amount of the brake pedal is detected by the brake pedal sensor and a force that is based on the detected operation amount is generated by an electric component and transmitted to the oil or the like (brake-by-wire system), or a system using both the systems described above. If at least a part of the force generated by the user's operation for the brake pedal is directly transmitted to the oil, or the like, the pressure of the oil or the like is generated on the brake pedal as a resistance force through reaction to the transmission of the force. In this case, the resistance force to the operation amount of the pedal has different characteristics between a case where the second actuator unit 20 generates the braking force by using the service brake at the start of the user's operation for the brake pedal and a ease where the second actuator unit 20 does not generate the braking force by using the service brake at the start of the user's operation for the brake pedal. Therefore, the user's operation feel for the brake differs between the two cases.

For example, the service brake according to this embodiment is not a complete brake-by-wire system, and. the resistance force to the operation amount of the brake pedal has different Characteristics in the case where the braking force is generated at the start of operation as compared to the case where the braking three is not generated at the start of operation.

In this embodiment, the period T or T' can be set to a value at which the period T or T' is expected to end earlier than the timing of the user's operation for the brake pedal as in the examples illustrated in FIGS. 23 and 24 by appropriately setting the predetermined time used in Step S203, the predetermined value used in Step S206, and the periods T and T' to be set in Steps S207 and S208, and by repeating the processing operations of Steps S202 to S208. For example, the period T may be set shorter than the predetermined time in Step S203, the period T' may be set longer than the predetermined time, and the predetermined value may be set to 0.

In the period T or T' after the start of coasting, the second actuator unit 20 can generate the jerk by using the service brake. After an elapse of the period T or T', the second actuator unit 20 can stop generating the jerk by using the service brake before the time when the user operates the brake pedal, which is predicted based on the tendency of the previous foot transfer time of the user. Therefore, influence cm the operation feel obtained when the user depresses the brake pedal can be reduced even when the second actuator unit 20 generates the jerk by using the service brake.

Effects

In this embodiment, the generation of the jerk is partially limited as compared to the first embodiment and the second embodiment, but the jerk is generated within a possible range, Therefore, the appropriate deceleration feel of the vehicle 1 can be provided and the shock can be suppressed at the same time similarly to the first embodiment and the second embodiment. Accordingly, the ride comfort can be improved. Further effects attained in this embodiment are described below.

In this embodiment, the period in which the second actuator unit 20 can generate the jerk by using the service brake is limited as described above so that the period ends earlier than the time Mien the user is expected to operate the brake pedal. Thus, even if the resistance force to the operation amount of the brake pedal has, depending on the structure of the service brake, different characteristics between the case where the braking force is generated at the start of operation arid the case where the braking force is not generated at the start of operation and if the second actuator unit 20 generates the jerk by using the service brake, the possibility of influence on the operation feel of the brake pedal that may lead to user's discomfort can be reduced when the user operates the brake pedal after the generation of the jerk.

The period in which the second actuator unit 20 Can generate the jerk by using the service brake is set based on the tendency of the previous foot transfer time of the user, Therefore, if the foot transfer time tends to be relatively long, the jerk can be generated by using the service brake for a relatively long time. Thus, the deceleration feel during coasting can be obtained more suitably than a case where the jerk is generated by using the service brake for a relatively short time.

There is no limitation op the method for setting the periods T and T' in which the second actuator unit 20 can generate the jerk by using the service brake. The periods may be set by using various leaning algorithms as long as a longer period can be set as the previous foot transfer time of the user tends to be longer and the generation of the jerk using the service brake can be terminated before the time when the user is expected to operate the brake pedal based on the previous foot transfer time to prevent influence on the operation feel of the brake pedal.

For example, when the target acceleration is Set as described in the first embodiment and the acceleration of the vehicle 1 reaches the target acceleration before the period T or T' elapses, the generation of the jerk may be stopped at this time.

In this embodiment, it is only necessary that the operation period of the service brake can be limited based on the tendency of the foot transfer time of the user. The second actuator unit 20 may include the service brake alone without other actuators, or may include another actuator in place of or in addition to the in-wheel motor.

Although the embodiments of the disclosure have been described above, the features of the embodiments may be combined, modified, or omitted as appropriate. The disclosure may be regarded not only as the braking force controller but also as, for example, a braking force control method to be executed by one or more computers provided, in the braking three controller, a braking three control program, a non-transitory computer-readable recording medium that stores the braking force control program, a braking force control system, and a vehicle on which the braking force control system is mounted.

The disclosure is useful in a braking force controller to be mounted on a vehicle or the like.

What is claimed is:

1. A braking force controller for a vehicle including a differential gear, a first actuator unit configured to generate a first braking force in the vehicle by transmitting a first force to a wheel via the differential gear, and a second actuator unit configured to generate a second braking force in the vehicle by transmitting a second force to the wheel without intervention of the differential gear, the braking force controller being configured to control the first and second braking forces, the braking force controller comprising:

processing circuitry configured to
calculate a target jerk, the target jerk being a target value of a jerk that is negative when a traveling direction of the vehicle is defined as a positive direction;
calculate a first jerk that causes no shock in the differential gear when the first jerk is generated by the first actuator unit, the first jerk being a minimum jerk when the traveling direction of the vehicle is defined as the positive direction;
calculate a second jerk generable by the second actuator unit, the second jerk being a minimum jerk when the traveling direction of the vehicle is defined as the positive direction; and
control a jerk generated by the first actuator unit and a jerk generated by the second actuator unit, based on the calculated target jerk, the calculated first jerk, and the calculated second jerk.

2. The braking force controller of claim 1, wherein the processing circuitry is further configured to
cause the first actuator unit to generate the target jerk when the target jerk is equal to or larger than the first jerk;
cause the first actuator unit to generate the first jerk and the second actuator unit to generate a jerk obtained by subtracting the first jerk from the target jerk as an additional jerk when the target jerk is smaller than the first jerk and equal to or larger than a sum of the first jerk and the second jerk; and
cause the first actuator unit to generate the first jerk and the second actuator unit to generate the second jerk as the additional jerk when the target jerk is smaller than the sum of the first jerk and the second jerk.

3. The braking force controller according to claims 2, wherein
the second actuator unit includes an in-wheel motor and a service brake; and
the processing circuitry is further configured to
calculate a third jerk generable by the in-wheel motor, the third jerk being a minimum jerk when the traveling direction of the vehicle is defined as the positive direction;
cause the in-wheel motor to generate the additional jerk when the additional jerk is equal to or larger than the third jerk;
cause the in-wheel motor to generate the third jerk when the additional jerk is smaller than the third jerk; and
cause the service brake to generate a jerk obtained by subtracting third jerk from the additional jerk.

4. The braking force controller according to claim 1, wherein the processing circuitry is further configured to calculate the target jerk based on a vehicle speed.

5. The braking force controller according to claim 4, wherein the processing circuitry is configured to calculate the target jerk based on at least one of a drive mode and a road gradient, the drive mode indicating a traveling characteristic specified by a user.

6. The braking force controller according to claim 1, wherein
the first actuator unit includes at least an engine; and
the processing circuitry is further configured to calculate the first jerk based on at least a temperature of a coolant of the engine.

7. The braking force controller according to claim 1, wherein
the first actuator unit includes at least a transmission; and
the processing circuitry is further configured to calculate the first jerk based on at least a gear ratio of the transmission.

8. The braking force controller according to claim 1, wherein
the second actuator unit includes an in-wheel motor; and
the processing circuitry is further configured to calculate second jerk based on at least one of a charging rate of a battery and a temperature of the in wheel motor, the battery being charged by regenerated power of the in-wheel motor.

9. The braking force controller according to claim 1, wherein
the second actuator unit includes a service brake; and
the processing circuitry is further configured to calculate the second jerk based on a temperature of a friction material Of the service brake.

10. The braking force controller according to claim 1, wherein
the second actuator unit includes a service brake;
the service brake is configured. such that a resistance force to an operation amount of a brake pedal when the second braking force is generated at a start of an operation has a characteristic different from a characteristic of a resistance force to the operation amount of the brake pedal when the second braking force is not generated at the start of the operation; and
the processing circuitry is further configured to measure a foot transfer time ranging from a start of a coasting state 1w a user to the start of the operation o the brake pedal by the user, and determine, based on the measured foot transfer time, a period in which the jerk is generated by using the service brake.

11. A vehicle, comprising:
a differential gear;
a first actuator unit configured to generate a first braking force in the vehicle by transmitting a first force to a wheel via the differential gear;
a second actuator unit configured to generate a second braking force in the vehicle by transmitting a second force to the wheel without intervention of the differential gear; and
a braking force controller configured to control the first and second braking forces, wherein the braking force controller is further configured to
calculate a target jerk, the target jerk being a target value of a jerk that is negative when a traveling direction of the vehicle is defined as a positive direction;
calculate a first jerk that causes no shock in the differential gear when the first jerk is generated by the first actuator unit, the first jerk being a minimum jerk when the traveling direction of the vehicle is defined as the positive direction;
calculate a second jerk generable by the second actuator unit, the second jerk being a minimum jerk when the traveling direction of the vehicle is defined as the positive direction; and
control a jerk generated by the first actuator unit and a jerk generated by the second actuator unit, based on the calculated target jerk, the calculated first jerk, and the calculated second jerk.

12. The vehicle according to claim 11, wherein the braking force controller is further configured to calculate the target jerk based on a vehicle speed.

13. The vehicle according to claim 12, wherein the braking force controller is further configured to calculate the target jerk based on at least one of a drive mode and a road gradient, the drive mode indicating a traveling characteristic specified by a user.

14. The vehicle according to claim 1, wherein
the first actuator unit includes at least an engine; and
the braking force controller is further configured to calculate the first jerk based on at least a temperature of a coolant of the engine.

15. The vehicle according to claim 11, wherein
the first actuator unit includes at least a transmission; and
the braking force controller is further configured to calculate the first jerk based on at least a gear ratio of the transmission.

16. The vehicle according to claim 11, wherein
the second actuator unit includes an in-wheel motor; and
the braking force controller is further configured to calculate the second jerk based on at least one of a chairing rate of a battery and a temperature of the in-wheel motor, the battery being charged by regenerated power of the in-wheel motor.

17. The vehicle according to claim 11, wherein:
the second actuator unit includes a service brake; and
the braking force controller is further configured to calculate the second jerk based on a temperature of a friction material of the service brake.

18. The vehicle according to claim 11, wherein
the second actuator unit includes a service brake;
the service brake is configured such that a resistance force to an operation amount of a brake pedal when the second braking force is generated at a start of an operation has a characteristic different from a characteristic of a resistance force to the operation amount of the brake pedal when the second braking force is not generated at the start of the operation; and
the braking force controller is further configured to measure a foot transfer time ranging from a start of a coasting state by a user to the start of the operation or the brake pedal by the user, and determine, based on the measured foot transfer time, a period in which the jerk is generated by using the service brake.

19. A method for controlling braking forces of a vehicle including a differential gear, a first actuator unit configured to generate a first braking force in the vehicle by transmitting a first force to a wheel via the differential gear, and a second actuator unit configured to generate a second braking force in the vehicle by transmitting a second force to the wheel without intervention of the differential gear, the method comprising:
calculating a target jerk, the target jerk being a target value of a jerk that is negative when a traveling direction of the vehicle is defined as a positive direction;
calculating a first jerk that causes no shock in the differential gear when the first jerk is generated by the first actuator unit, the first jerk being a minimum jerk when the traveling direction of the vehicle is defined as the positive direction;

calculating a second jerk generable by the second actuator unit, the second jerk being a minimum jerk when the traveling direction of the vehicle is defined as the positive direction; and controlling a jerk generated b the first actuator unit and a jerk generated by the second actuator unit based on the calculated target jerk, the calculated first jerk, and the calculated second jerk.

20. The method according to claim 19, wherein the method further comprises:

causing the first actuator unit to generate the target jerk when the target jerk is equal to or larger than the first jerk;

causing the first actuator unit to generate the first jerk and the second actuator unit to generate a jerk obtained by subtracting the first jerk from the target jerk as an additional jerk when the target jerk is smaller than the first jerk and equal to or larger than a sum of the first jerk and the second jerk; and causing the first actuator unit to generate the first jerk and the second actuator unit to generate the second jerk as the additional jerk when the target jerk is smaller than the sum of the first jerk and the second jerk.

* * * * *